US010993151B2

(12) United States Patent
Sadek et al.

(10) Patent No.: US 10,993,151 B2
(45) Date of Patent: Apr. 27, 2021

(54) CELL SWITCHING FOR DISCONTINUOUS TRANSMISSION (DTX) IN SHARED SPECTRUM

(71) Applicants: QUALCOMM Incorporated, San Diego, CA (US); Ahmed Kamel Sadek, San Diego, CA (US); Tamer Adel Kadous, San Diego, CA (US); Peng Cheng, Beijing (CN); Nachiappan Valliappan, Sunnyvale, CA (US); Mohammad Naghshvar, San Diego, CA (US)

(72) Inventors: Ahmed Kamel Sadek, San Diego, CA (US); Tamer Adel Kadous, San Diego, CA (US); Peng Cheng, Beijing (CN); Nachiappan Valliappan, Sunnyvale, CA (US); Mohammad Naghshvar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/526,741

(22) PCT Filed: Nov. 12, 2015

(86) PCT No.: PCT/CN2015/094466
§ 371 (c)(1),
(2) Date: May 12, 2017

(87) PCT Pub. No.: WO2016/074637
PCT Pub. Date: May 19, 2016

(65) Prior Publication Data
US 2017/0332288 A1 Nov. 16, 2017

(30) Foreign Application Priority Data
Nov. 13, 2014 (WO) ............... PCT/CN2014/090973

(51) Int. Cl.
*H04W 36/00* (2009.01)
*H04L 1/18* (2006.01)
(Continued)

(52) U.S. Cl.
CPC ........... *H04W 36/0055* (2013.01); *H04L 1/00* (2013.01); *H04L 1/1887* (2013.01); *H04L 5/001* (2013.01);
(Continued)

(58) Field of Classification Search
CPC ......... H04W 36/0055; H04W 36/0069; H04W 72/0406; H04W 52/0216; H04W 88/06;
(Continued)

(56) References Cited

U.S. PATENT DOCUMENTS 6,009,334 A * 12/1999 Grubeck ............... H04W 64/00
455/456.2
2004/0142692 A1 * 7/2004 Schwarz ............... H04W 52/12
455/442
(Continued)

FOREIGN PATENT DOCUMENTS

CN 101009537 A 8/2007
CN 102548004 A 7/2012
(Continued)

OTHER PUBLICATIONS

International Search Report and Written Opinion—PCT/CN2015/094466—ISA/EPO—dated Nov. 12, 2015.
(Continued)

*Primary Examiner* — Gregory B Sefcheck
*Assistant Examiner* — Joshua Smith
(74) *Attorney, Agent, or Firm* — Muncy, Geissler, Olds & Lowe, P.C.

(57) ABSTRACT

Techniques for co-existence between wireless Radio Access Technologies (RATs) are disclosed. During an active period
(Continued)

of a Discontinuous Transmission (DTX) communication pattern, a first signal may be transmitted during a first subframe and a second signal may be transmitted during a second subframe, while during an inactive period the first signal may be transmitted during the first subframe and the second signal may be omitted during the second subframe. Retransmission of one or more packets may take place over a subset of less than all retransmission opportunities based on the DTX communication pattern. A Secondary Cell (SCell) may be reconfigured as the Primary Cell (PCell) and the PCell may be reconfigured as the SCell for one or more access terminals based on a load balancing condition or a channel selection condition.

20 Claims, 33 Drawing Sheets

(51) Int. Cl.
*H04W 72/04* (2009.01)
*H04W 52/02* (2009.01)
*H04W 28/18* (2009.01)
*H04L 1/00* (2006.01)
*H04L 5/00* (2006.01)
*H04W 88/06* (2009.01)
*H04W 72/00* (2009.01)

(52) U.S. Cl.
CPC ... *H04W 36/0069* (2018.08); *H04W 72/0406* (2013.01); *H04W 28/18* (2013.01); *H04W 52/0216* (2013.01); *H04W 72/00* (2013.01); *H04W 88/06* (2013.01); *Y02D 30/70* (2020.08)

(58) Field of Classification Search
CPC ........ H04W 28/18; H04W 72/00; H04L 1/00; H04L 1/1887; H04L 5/001; H04L 1/1854; Y02D 30/70
See application file for complete search history.

(56) References Cited

U.S. PATENT DOCUMENTS

| | | | | |
|---|---|---|---|---|
| 2008/0108367 A1* | 5/2008 | Afrashteh | ............ | H04W 48/18 455/452.2 |
| 2008/0125124 A1* | 5/2008 | Craig | ............... | H04W 36/0055 455/436 |
| 2008/0227456 A1* | 9/2008 | Huang | ............. | H04W 72/0406 455/436 |
| 2011/0026475 A1* | 2/2011 | Lee | ......................... | H04L 5/001 370/329 |
| 2011/0158089 A1* | 6/2011 | Sambhwani | .......... | H04W 36/22 370/230 |
| 2011/0158211 A1 | 6/2011 | Gaal et al. | | |
| 2011/0292911 A1* | 12/2011 | Uemura | ............ | H04W 36/0072 370/331 |
| 2012/0106511 A1* | 5/2012 | Wu | ....................... | H04W 76/34 370/331 |
| 2012/0213095 A1* | 8/2012 | Krishnamurthy | ....... | H04L 5/001 370/252 |
| 2012/0214490 A1* | 8/2012 | Kobayashi | ............ | H04W 36/20 455/436 |
| 2013/0010763 A1* | 1/2013 | Chen | ...................... | H04L 5/001 370/331 |
| 2013/0114568 A1* | 5/2013 | Sagae | ................... | H04W 36/30 370/332 |
| 2013/0165124 A1* | 6/2013 | Liang | ................ | H04W 36/0061 455/437 |
| 2013/0194981 A1* | 8/2013 | Wang | .................... | H04L 1/1671 370/280 |
| 2013/0195073 A1 | 8/2013 | Chen et al. | | |
| 2013/0201884 A1 | 8/2013 | Freda et al. | | |
| 2013/0235814 A1 | 9/2013 | Wietfeldt et al. | | |
| 2013/0301503 A1 | 11/2013 | Park | | |
| 2014/0023052 A1* | 1/2014 | Yang | ..................... | H04W 74/08 370/336 |
| 2014/0140314 A1 | 5/2014 | Wei et al. | | |
| 2014/0161002 A1 | 6/2014 | Gauvreau et al. | | |
| 2014/0177601 A1* | 6/2014 | Nishio | ................. | H04W 24/10 370/332 |
| 2014/0335863 A1* | 11/2014 | Wu | ................... | H04W 36/0083 455/436 |
| 2015/0050941 A1 | 2/2015 | Sawada et al. | | |
| 2015/0131441 A1 | 5/2015 | Huang et al. | | |
| 2015/0208411 A1* | 7/2015 | Mochizuki | ........ | H04W 72/0453 455/452.1 |
| 2015/0358863 A1* | 12/2015 | Yamamoto | ............ | H04W 76/15 370/331 |
| 2016/0037470 A1* | 2/2016 | Bartlett | ............... | H04W 60/005 455/435.2 |
| 2016/0165428 A1* | 6/2016 | Lee | ........................ | H04W 8/20 455/434 |

FOREIGN PATENT DOCUMENTS

| | | |
|---|---|---|
| CN | 102740360 A | 10/2012 |
| CN | 103069911 A | 4/2013 |
| CN | 103906105 A | 7/2014 |
| EP | 2709415 A1 | 3/2014 |
| JP | 2013191925 A | 9/2013 |
| JP | 2014183357 A | 9/2014 |
| JP | 2015508958 A | 3/2015 |
| WO | 2010151849 | 12/2010 |
| WO | 2012115797 A1 | 8/2012 |
| WO | 2012136269 A1 | 10/2012 |
| WO | 2013075738 A1 | 5/2013 |
| WO | 2013112983 A2 | 8/2013 |
| WO | 2014114273 A1 | 7/2014 |
| WO | 2014129960 A1 | 8/2014 |
| WO | 2014161176 A1 | 10/2014 |
| WO | 2014172306 A2 | 10/2014 |

OTHER PUBLICATIONS

Motorola., "New Carrier Type," 3GPP Draft; R2-122706, 3rd Generation Partnership Project (3GPP), Mobile Competence Centre, 650, Route Des Lucioles, F-06921 Sophia-Antipolis Cedex, France, Czech Republic, May 15, 2012 (May 15, 2012), XP050607367, pp. 2 pages.
NEC., "PCell change in dual connectivity," 3GPP Draft, R2-140511, PCELL Change in DC, 3rd Generation Partnership Project (3GPP), Mobile Competence Centre, 650, Route Des Lucioles ; F-06921, Sophia-Antipolis Cedex, France, Czech Republic; Feb. 9, 2014 (Feb. 9, 2014), XP050791860, pp. 2 pages. Retrieved from the Internet: URL:http://www.3gpp.org/ftp/Meetings_3GPP_SYNC/ RAN2/Docs/ [retrieved on Feb. 9, 2014].
Nokia., et al., "Image Rejection in intraband carrier aggregation," 3GPP Draft 3rd Generation Partnership Project (3GPP), Mobile Competence Centre, R4-103677, Route Des Lucioles ; F-06921 Sophia-Antipolis Cedex ; France,Oct. 5, 2010 (Oct. 5, 2010), XP050455118, pp. 8 pages.
Qualcomm., "UE Specific linking of UL and DL PCC," 3GPP Draft, R2-122220, 3rd Generation Partnership Project (3GPP), Mobile Competence Centre, 650, Route Des Lucioles, F-06921, Sophia-Antipolis Cedex, France, Czech Republic, May 15, 2012 (May 15, 2012), XP050607185, pp. 5 pages.
Supplementary European Search Report—EP3202072—Search Authority—Munich—dated Jul. 21, 2017.

* cited by examiner

CELL SWITCHING FOR DISCONTINUOUS TRANSMISSION (DTX) IN SHARED SPECTRUM

CROSS-REFERENCE TO RELATED APPLICATIONS

This application is a 35 U.S.C. 371 National Phase of PCT Application Serial No. PCT/CN2015/094466, entitled "CELL SWITCHING FOR DISCONTINUOUS TRANSMISSION (DTX) IN SHARED SPECTRUM" filed Nov. 12, 2015, which claims priority to PCT Application Serial No. PCT/CN2014/090973, entitled "STANDALONE CARRIER SENSE ADAPTIVE TRANSMISSION (CSAT) IN UNLICENSED SPECTRUM" filed Nov. 13, 2014, in the Chinese Receiving Office (RO/CN), and assigned to the assignee hereof, and expressly incorporated herein by reference in its entirety.

INTRODUCTION

Aspects of this disclosure relate generally to telecommunications, and more particularly to co-existence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof.

In one example, a method of communication is disclosed. The method may include, for example, communicating over a communication medium in accordance with a first Radio Access Technology (RAT) and a corresponding radio frame structure, each radio frame of the radio frame structure defining a first subframe for transmitting a first signal and a second subframe for transmitting a second signal; transmitting the first signal during the first subframe and the second signal during the second subframe of one or more radio frames during at least one active period of a Discontinuous Transmission (DTX) communication pattern defining active and inactivate periods of communication for the first RAT; and transmitting the first signal during the first subframe and omitting the second signal during the second subframe of one or more radio frames during at least one inactive period of the DTX communication pattern.

In another example, a communication apparatus is disclosed. The apparatus may include, for example, a transceiver, at least one processor, and at least one memory coupled to the at least one processor. The transceiver may be configured to communicate over a communication medium in accordance with a first RAT and a corresponding radio frame structure, each radio frame of the radio frame structure defining a first subframe for transmitting a first signal and a second subframe for transmitting a second signal. The at least one processor and the at least one memory may be configured to direct the transceiver to: transmit the first signal during the first subframe and the second signal during the second subframe of one or more radio frames during at least one active period of a DTX communication pattern defining active and inactivate periods of communication for the first RAT, and transmit the first signal during the first subframe and omit the second signal during the second subframe of one or more radio frames during at least one inactive period of the DTX communication pattern.

In another example, a communication apparatus is disclosed. The apparatus may include, for example, means for communicating over a communication medium in accordance with a first RAT and a corresponding radio frame structure, each radio frame of the radio frame structure defining a first subframe for transmitting a first signal and a second subframe for transmitting a second signal; means for transmitting the first signal during the first subframe and the second signal during the second subframe of one or more radio frames during at least one active period of a DTX communication pattern defining active and inactivate periods of communication for the first RAT; and means for transmitting the first signal during the first subframe and omitting the second signal during the second subframe of one or more radio frames during at least one inactive period of the DTX communication pattern.

In another example, a transitory or non-transitory computer-readable medium including code, which, when executed by a processor, causes the processor to perform operations for communication is disclosed. The computer-readable medium may include, for example, code for communicating over a communication medium in accordance with a first RAT and a corresponding radio frame structure, each radio frame of the radio frame structure defining a first subframe for transmitting a first signal and a second subframe for transmitting a second signal; code for transmitting the first signal during the first subframe and the second signal during the second subframe of one or more radio frames during at least one active period of a DTX communication pattern defining active and inactivate periods of communication for the first RAT; and code for transmitting the first signal during the first subframe and omitting the second signal during the second subframe of one or more radio frames during at least one inactive period of the DTX communication pattern.

In another example, a method of communication is disclosed. The method may include, for example, receiving, during an active period of a DTX communication pattern defining active and inactivate periods of communication over a communication medium in accordance with a first RAT, a request for retransmission of one or more packets; determining a set of retransmission opportunities for a synchronous uplink Hybrid Automatic Repeat Request (HARQ) retransmission schedule for retransmitting the one or more packets; and retransmitting the one or more packets over a subset of less than all of the retransmission opportunities based on the DTX communication pattern.

In another example, a communication apparatus is disclosed. The apparatus may include, for example, a transceiver, at least one processor, and at least one memory coupled to the at least one processor. The transceiver may be configured to receive, during an active period of a DTX communication pattern defining active and inactivate periods of communication over a communication medium in accordance with a first RAT, a request for retransmission of one or more packets. The at least one processor and the at least one memory may be configured to determine a set of retransmission opportunities for a synchronous uplink HARQ retransmission schedule for retransmitting the one or more packets, and direct the transceiver to retransmit the one or more packets over a subset of less than all of the retransmission opportunities based on the DTX communication pattern.

In another example, a communication apparatus is disclosed. The apparatus may include, for example, means for receiving, during an active period of a DTX communication pattern defining active and inactivate periods of communication over a communication medium in accordance with a first RAT, a request for retransmission of one or more packets; means for determining a set of retransmission opportunities for a synchronous uplink Hybrid Automatic Repeat Request (HARQ) retransmission schedule for retransmitting the one or more packets; and means for retransmitting the one or more packets over a subset of less than all of the retransmission opportunities based on the DTX communication pattern.

In another example, a transitory or non-transitory computer-readable medium including code, which, when executed by a processor, causes the processor to perform operations for communication is disclosed. The computer-readable medium may include, for example, code for receiving, during an active period of a DTX communication pattern defining active and inactivate periods of communication over a communication medium in accordance with a first RAT, a request for retransmission of one or more packets; code for determining a set of retransmission opportunities for a synchronous uplink HARQ retransmission schedule for retransmitting the one or more packets; and code for retransmitting the one or more packets over a subset of less than all of the retransmission opportunities based on the DTX communication pattern.

In another example, a method of communication is disclosed. The method may include, for example, exchanging data and control signaling over a communication medium via a Primary Cell (PCell) provided by an access point on a first component carrier; exchanging data signaling over the communication medium via a Secondary Cell (SCell) provided by the access point on a second component carrier; and reconfiguring the SCell as the PCell and the PCell as the SCell for one or more access terminals based on a load balancing condition or a channel selection condition.

In another example, a communication apparatus is disclosed. The apparatus may include, for example, a transceiver, at least one processor, and at least one memory coupled to the at least one processor. The transceiver may be configured to exchange data and control signaling over a communication medium via a PCell provided by an access point on a first component carrier, and to exchange data signaling over the communication medium via a SCell provided by the access point on a second component carrier. The at least one processor and the at least one memory may be configured to direct the transceiver to reconfigure the SCell as the PCell and the PCell as the SCell for one or more access terminals based on a load balancing condition or a channel selection condition.

In another example, a communication apparatus is disclosed. The apparatus may include, for example, means for exchanging data and control signaling over a communication medium via a PCell provided by an access point on a first component carrier; means for exchanging data signaling over the communication medium via a SCell provided by the access point on a second component carrier; and means for reconfiguring the SCell as the PCell and the PCell as the SCell for one or more access terminals based on a load balancing condition or a channel selection condition.

In another example, a transitory or non-transitory computer-readable medium including code, which, when executed by a processor, causes the processor to perform operations for communication is disclosed. The computer-readable medium may include, for example, code for exchanging data and control signaling over a communication medium via a PCell provided by an access point on a first component carrier; code for exchanging data signaling over the communication medium via a SCell provided by the access point on a second component carrier; and code for reconfiguring the SCell as the PCell and the PCell as the SCell for one or more access terminals based on a load balancing condition or a channel selection condition.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to a Standalone (SA) design for co-existence techniques referred to herein as Discontinuous Transmission (DTX). For SA operation, various techniques are described in detail below to facilitate aspects such as control signaling, access terminal synchronization, channel selection, paging, random access, interference management, retransmission, discontinuous reception, cell transition, and so on, in accordance with a DTX communication scheme.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
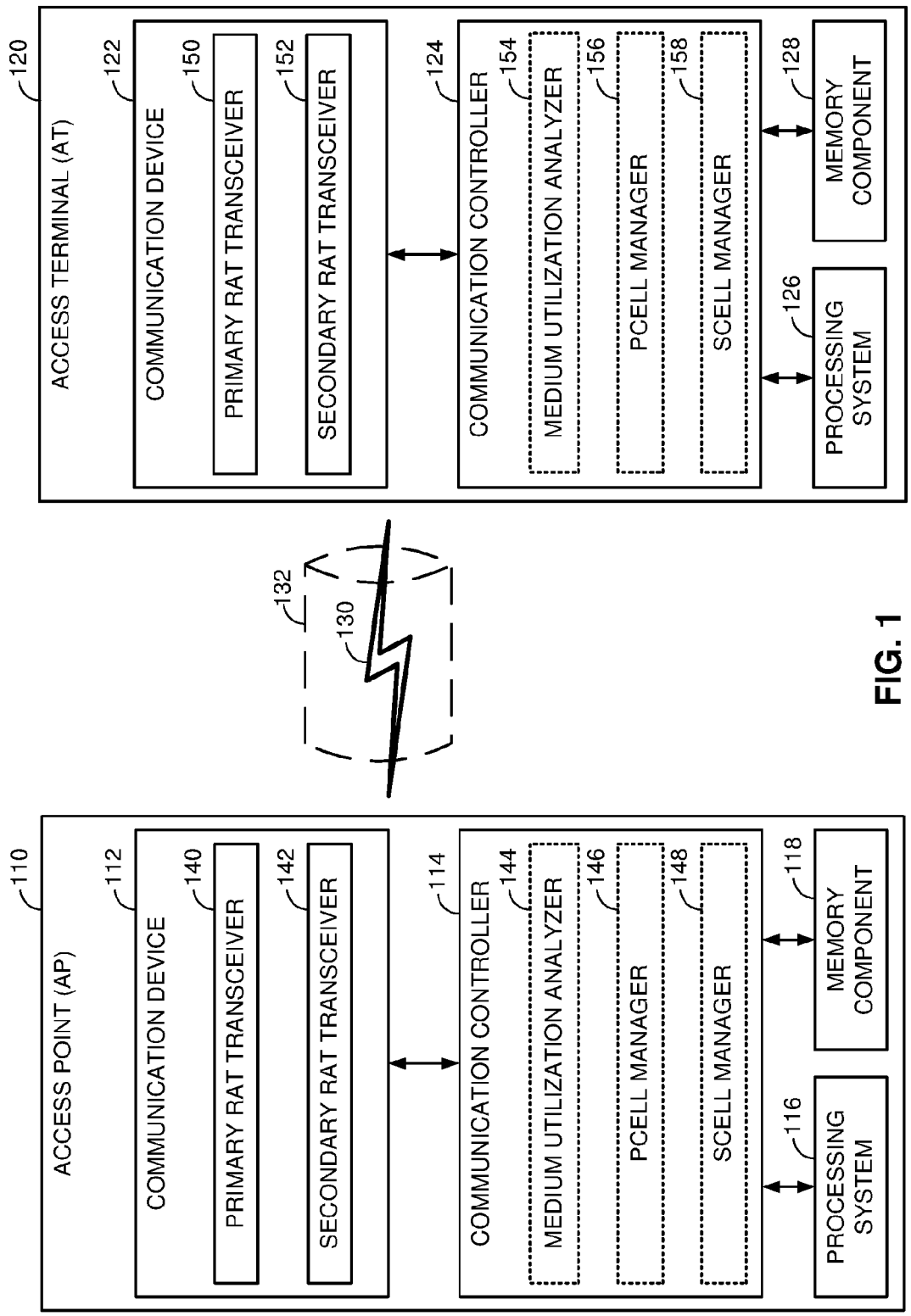
FIG. 1 illustrates an example wireless communication system including an Access Point (AP) in communication with an Access Terminal (AT).

FIG. 1 illustrates an example wireless communication system including an Access Point (AP) in communication with an Access Terminal (AT). Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wi-Fi APs, other small coverage area APs, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128). In some designs, the communication controllers 114 and 124 may be partly or wholly subsumed by the respective host system functionality.

Turning to the illustrated communication in more detail, the access terminal 120 may transmit and receive messages via a wireless link 130 with the access point 110, the message including information related to various types of communication (e.g., voice, data, multimedia services, associated control signaling, etc.). The wireless link 130 may operate as part of a cell, including Primary Cells (PCells) and Secondary Cells (SCells), on respective component carriers (respective frequencies). The wireless link 130 may operate over a communication medium of interest that includes the component carriers, shown by way of example in FIG. 1 as the communication medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the communication medium 132.

As an example, the communication medium 132 may correspond to at least a portion of an unlicensed frequency band shared with other RATs. In general, the access point 110 and the access terminal 120 may operate via the wireless link 130 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points, have extended operation into unlicensed frequency bands such as the Unlicensed National Information Infrastructure (U-NII) band used by Wireless Local Area Network (WLAN) technologies, most notably IEEE 802.11x WLAN technologies generally referred to as "Wi-Fi."

In the example of FIG. 1, the communication device 112 of the access point 110 includes two co-located transceivers operating according to respective RATs, including a primary RAT transceiver 140 configured to operate in accordance with one RAT and a secondary RAT transceiver 142 configured to operate in accordance with another RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a Wi-Fi chip or similar circuitry simply providing low-level sniffing) . Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The primary RAT transceiver 140 and the secondary RAT transceiver 142 may provide different functionalities and may be used for different purposes. As an example, the primary RAT transceiver 140 may operate in accordance with Long Term Evolution (LTE) technology to provide communication with the access terminal 120 on the wireless link 130, while the secondary RAT transceiver 142 may operate in accordance with Wi-Fi technology to monitor Wi-Fi signaling on the communication medium 132 that may interfere with or be interfered with by the LTE communications. The secondary RAT transceiver 142 may or may not serve as a full Wi-Fi AP providing communication services to a corresponding Basic Service Set (BSS). The communication device 122 of the access terminal 120 may, in some designs, include similar primary RAT transceiver and/or secondary RAT transceiver functionality, as shown in FIG. 1 by way of the primary RAT transceiver 150 and the secondary RAT transceiver 152, although such dual-transceiver functionality may not be required.

As will be discussed in more detail below with reference to FIGS. 2-16, the communication controller 114 of the access point 110 may include, in various designs, a medium utilization analyzer 144, a Primary Cell (PCell) manager 146, and/or a Secondary Cell (SCell) manager 148, which may operate in conjunction with the primary RAT transceiver 140 and/or the secondary RAT transceiver 142 to manage operation on the communication medium 132. In addition or as an alternative, the communication controller 124 of the access terminal 120 may include similar or complimentary components, in various designs, shown by way of example as including a medium utilization analyzer 154, a Primary Cell (PCell) manager 156, and/or a Secondary Cell (SCell) manager 158, which may operate in conjunction with the primary RAT transceiver 150 and/or the secondary RAT transceiver 152 to manage operation on the communication medium 132. It will be appreciated that some or all of the illustrated components may be optional or omitted for various applications.

Figure 2:
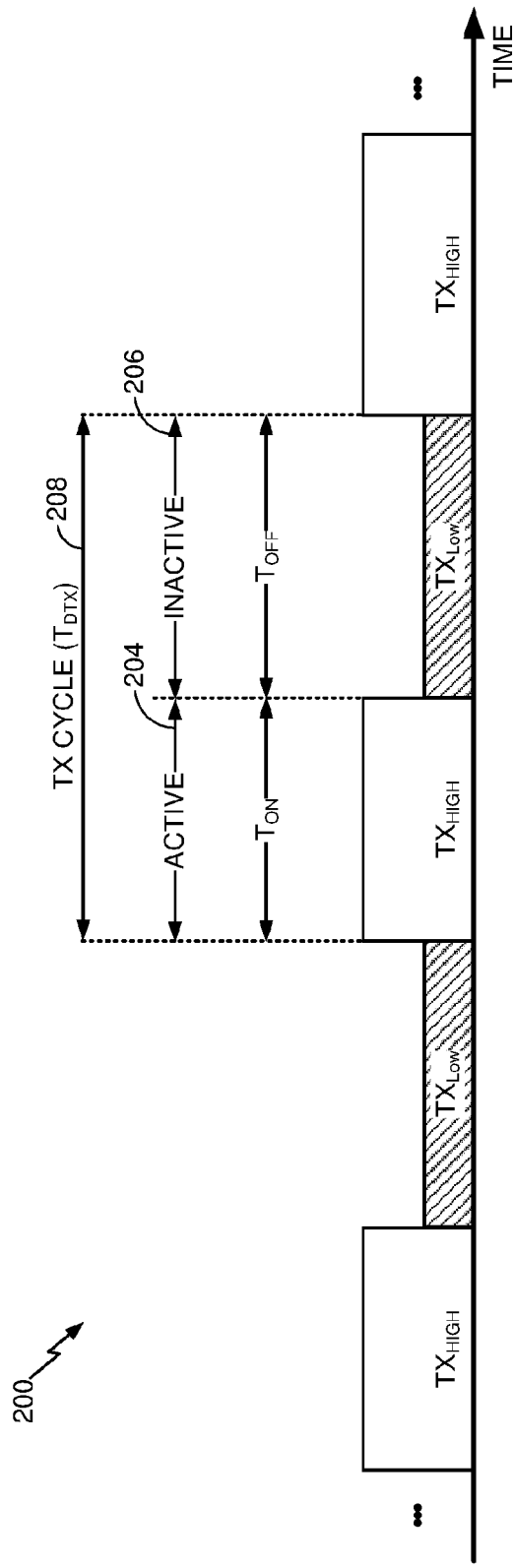
FIG. 2 illustrates certain aspects of an example long-term Discontinuous Transmission (DTX) communication scheme.

FIG. 2 illustrates certain aspects of an example long-term Discontinuous Transmission (DTX) communication scheme that may be implemented on the communication medium 132. The DTX communication scheme may be used to foster co-existence between (i) primary RAT communications between the access point 110 and access terminal 120 and (ii) other, secondary RAT communications between neighboring devices, for example, by switching operation of the primary RAT over the communication medium 132 between active periods 204 of communication and inactive periods 206 of communication. A given active period 204/inactive period 206 pair may constitute a transmission (TX) cycle ($T_{DTX}$) 208, which collectively form a communication pattern 200. During a period of time $T_{ON}$ associated with each active period 204, primary RAT transmission on the communication medium 132 may proceed at a normal, relatively high transmission power. During a period of time $T_{OFF}$ associated with each inactive period 206, however, primary RAT transmission on the communication medium 132 is disabled or at least sufficiently reduced to yield the communication medium 132 to neighboring devices operating according to the secondary RAT. During this time, various network listening functions and associated measurements may be performed via the medium utilization analyzer 144, as desired, such as medium utilization measurements, medium utilization sensing, and so on.

The DTX communication pattern 200 may be characterized by a set of one or more DTX parameters. Each of the associated DTX parameters, including, for example, a duty cycle (i.e., $T_{ON}/T_{DTX}$) and the respective transmission powers during active periods 204 and inactive periods 206, may be adapted based on the current signaling conditions on the communication medium 132 to dynamically optimize the DTX communication pattern 200. For example, the secondary RAT transceiver 142 configured to operate in accordance with the secondary RAT (e.g., Wi-Fi) may be further configured to monitor the communication medium 132 during the time period $T_{OFF}$ for secondary RAT signaling, which may interfere with or be interfered with by primary RAT communications over the communication medium 132. The medium utilization analyzer 144 may be configured to determine a utilization metric associated with utilization of the communication medium 132 by the secondary RAT signaling. Based on the utilization metric, the associated parameters may be set and the primary RAT transceiver 140 configured to operate in accordance with the primary RAT (e.g., LTE) may be further configured to cycle between active periods 204 of communication and inactive periods 206 of communication over the communication medium 132 in accordance therewith. As an example, if the utilization metric is high (e.g., above a threshold), one or more of the parameters may be adjusted such that usage of the communication medium 132 by the primary RAT transceiver 140 is reduced (e.g., via a decrease in the duty cycle or transmission power). Conversely, if the utilization metric is low (e.g., below a threshold), one or more of the parameters may be adjusted such that usage of the communication medium 132 by the primary RAT transceiver 140 is increased (e.g., via an increase in the duty cycle or transmission power).

In some DTX communication schemes, the switching between active periods 204 and inactive periods 206 may be largely predefined (e.g., periodic) and referred to as a Time Division Multiplexing (TDM) communication scheme. In other DTX communication schemes, the switching between active periods 204 and inactive periods 206 may be conditional and referred to as a Listen Before Talk (LBT) communication scheme. An LBT communication scheme is a contention-based protocol in which the period of time $T_{OFF}$ associated with each inactive period 206 may be used as a sensing interval for assessment of the communication medium 132 to determine whether to seize it or back off. For example, the secondary RAT transceiver 142 configured to operate in accordance with the secondary RAT (e.g., Wi-Fi) may be further configured to monitor the communication medium 132 during the time period $T_{OFF}$ for secondary RAT signaling, and the medium utilization analyzer 144 may be configured to determine if other secondary RAT devices are transmitting on the communication medium 132 before initiating the next active period 204. When no such transmissions are detected (e.g., above a signaling threshold), the next active period 204 may be initiated. When transmissions are in fact detected, the next active period 204 may be delayed (e.g., for a backoff period, after which the contention procedure is repeated).

A DTX communication scheme may be implemented in a variety of configurations of the wireless link 130, including (i) a supplemental configuration such as LTE Supplemental DownLink (SDL) with one or more Secondary Cells (SCells) of the wireless link 130 operating on the shared medium 132 in conjunction with an "anchor" Primary Cell (PCell) operating on a different portion of the spectrum or (ii) a standalone configuration such as LTE Standalone with both the PCell and any SCells of the wireless link 130 operating together on the shared medium 132. To facilitate PCell operation on the shared medium 132 for a standalone configuration of the wireless link 130, various techniques are described in detail below with respect to aspects such as control signaling, access terminal synchronization, channel selection, paging, random access, interference management, retransmission, discontinuous reception, cell transition, and so on.

Figure 3:
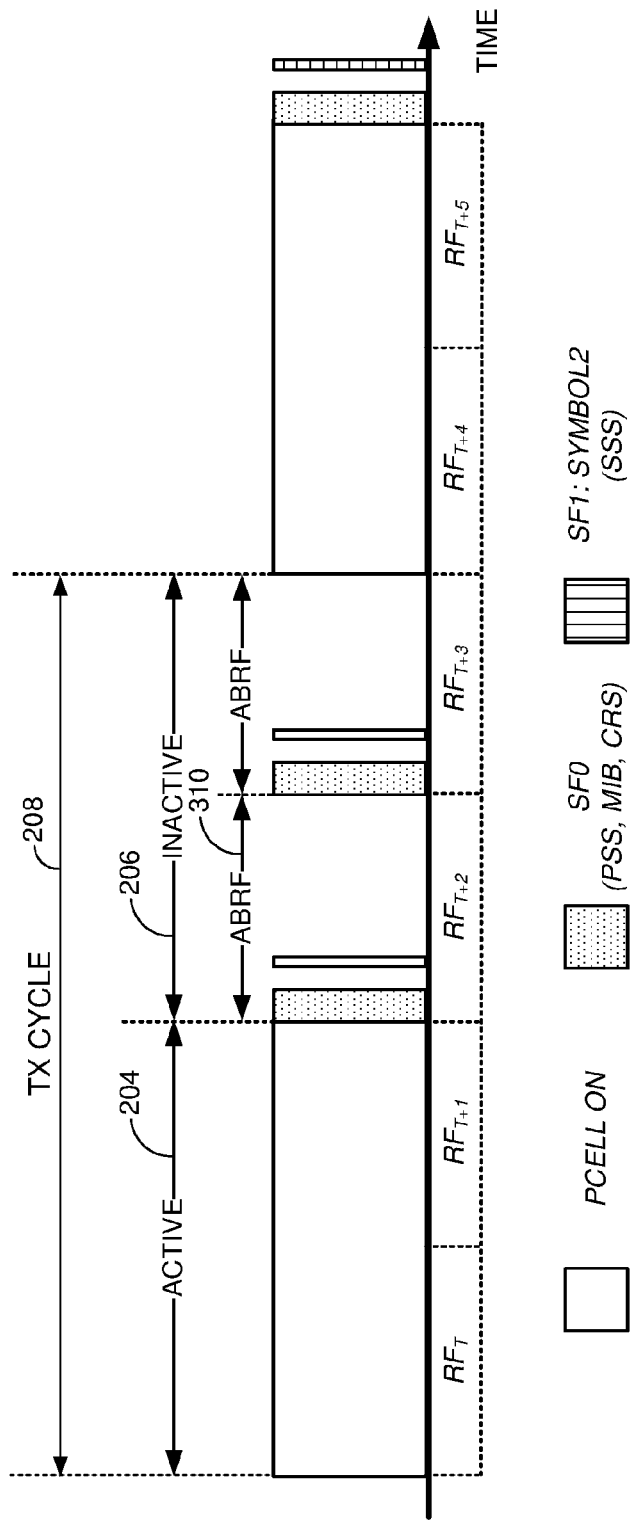
FIG. 3 illustrates an example DTX communication scheme for a PCell utilizing Almost Blank Radio Frames (ABRFs) to coordinate control signaling.

FIG. 3 illustrates an example DTX communication scheme for a PCell utilizing Almost Blank Radio Frames (ABRFs) to coordinate control signaling. As in FIG. 2, during active periods 204 of communication, primary RAT transmission on the communication medium 132 is enabled. During inactive periods 206, primary RAT transmission on the communication medium 132 is disabled to allow secondary RAT operations and to conduct measurements.

In this example, the DTX communication pattern 300 is temporally aligned with a radio frame structure illustrated in the context of a System Frame Number (SFN) numerology. The use of a system-specific timing pattern framework may provide more natural and efficient coordination among access points than system-independent techniques. As an example, an LTE system frame is divided into 1024 numbered Radio Frames (RFs), which together constitute an SFN cycle (e.g., lasting 10.24 s for 10 ms RFs). DTX timing parameters such as the cycle duration ($T_{DTX}$) and the duty cycle ($T_{ON}/T_{DTX}$) may be aligned and adapted to fit within the framework of each SFN cycle. For example, each DTX cycle may cover a particular number of RFs (e.g., four RFs, $RF_T$ to $RF_{T+3}$, in FIG. 3) and be divided into active and inactive periods covering respective subsets of those RFs based on the associated duty cycle (e.g., two RFs, $RF_T$ to $RF_{T+1}$, for the active period 204 and two RFs, $RF_{T+2}$ to $RF_{T+3}$, for the inactive period 206 in FIG. 3, thereby implementing a 50% duty cycle). As another example, DTX cycles may be aligned with SFN cycle boundaries such that each SFN cycle starts with an active period 204 (e.g., an active period transition may be scheduled to occur at the first RF boundary). As another example, various measurement opportunities may be enforced at particular times within a given SFN cycle (e.g., in terms of specific RF locations).

As is further illustrated in FIG. 3, each inactive period 206 may include one or more ABRFs 310 configured to convey select control signaling during the inactive period 206 in order to facilitate continued system operation. The control signaling may include information relevant to timing synchronization, system acquisition, DTX parameter settings, interference measurements (e.g., Radio Resource Measurements (RRM)/Radio Link Measurements (RLM)), tracking loops, gain control (e.g., Automatic Gain Control (AGC)), etc. The ABRFs 310 may be sent over one or more than one of the RFs constituting the inactive period 206 (e.g., in accordance with a periodicity N representing the number of RFs over which the ABRF repeats).

In the illustrated example, the ABRFs 310 utilized for the inactive period 206 in FIG. 3 are configured for an LTE system and include transmission of the first LTE subframe (SF0) and the third OFDM symbol (symbol 2) of the second LTE subframe (SF1), with a periodicity of N=1 in each inactive RF (i.e., $RF_{T+2}$ and $RF_{T+3}$). The SF0 transmission includes Primary Synchronization Signal (PSS), Cell-specific Reference Signal (CRS), and Master Information Block (MIB) signaling. The SF1, symbol 2 transmission includes Secondary Synchronization Signal (SSS) signaling. Other signals that would be ordinarily transmitted may be omitted, such as select signals in SF1 as well as all or select signals in the other subframes, including the third LTE subframe (SF2), the fourth LTE subframe (SF3), the fifth LTE subframe (SF4), the sixth LTE subframe (SF5), the seventh LTE subframe (SF6), the eight LTE subframe (SF7), the ninth LTE subframe (SF8), and the tenth LTE subframe (SF9). Examples of the omitted signals may include a Physical Control Format Indicator Channel (PCFICH) signal, a Physical Hybrid-ARQ Indicator Channel (PHICH) signal, a Physical Downlink Control Channel (PDCCH) signal, a Physical Downlink Shared Channel (PDSCH) signal, a Physical Broadcast Channel (PBCH) signal, or a combination thereof.

It will be appreciated that different ABRF configurations may be used as desired depending on the primary RAT employed and the signaling desired. It will be further appreciated, however, that, while not required, limiting ABRF signaling to the first two subframes in an LTE system, for example, allows such a configuration to be used ubiquitously across all LTE Time Division Duplexing (TDD) configurations, which each utilize a common subframe structure during at least the first two subframes.

In some designs, the ABRF configuration may be dynamic, even within a given inactive period 206. For example, some control signals may require periodic transmission that is less frequent than every RF but potentially more frequent than certain DTX cycle settings would otherwise provide. The first LTE System Information Block (SIB-1) signaling, for example, may be adequately transmitted by relatively short DTX cycles where the transmission gap is 40 ms or shorter (e.g., $T_{DTX}$=2 or 4 RFs) but not adequately transmitted by other, relatively long DTX cycles (e.g., $T_{DTX}$=8 or 16 RFs). Accordingly, the subframe carrying such a signal (e.g., SF5 for SIB-1) or a punctured version thereof (retaining only the desired symbol periods) may be included in the ABRF configuration only when necessary in accordance with the required periodicity (e.g., as compared to the periodicity of the DTX communication pattern 200).

To coordinate access terminal operation with a standalone configuration of the wireless link 130, corresponding DTX parameters may be transmitted (e.g., broadcasted) to the access terminal 120 over the communication medium 132. Different parameters may be signaled in different ways. For example, in an LTE system, the DTX cycle duration ($T_{DTX}$) may be signaled via MIB signaling (e.g., using one or more reserved bits). As another example, the activated period duration ($T_{ON}$) or another indication of the DTX duty cycle ($T_{ON}/T_{DTX}$) may be signaled via Physical Downlink Control Channel (PDCCH) signaling (e.g., using a Downlink Control Information (DCI) message). Access terminal awareness of the DTX communication pattern may increase battery efficiency (e.g., by allowing the access terminal 120 to reduce monitoring during inactive periods 206) as well as reduce receiver complexity (e.g., by allowing the access terminal 120 to freeze different tracking loops during inactive periods 206).

Figure 4:
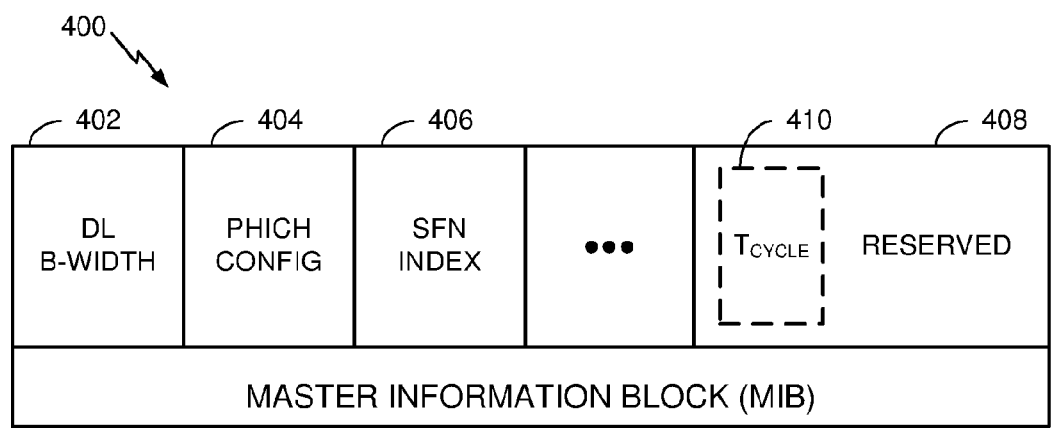
FIG. 4 illustrates an example Master Information Block (MIB) adapted to convey DTX parameter information.

FIG. 4 illustrates an example MIB adapted to convey DTX parameter information. In LTE, for example, a MIB is transmitted on the Physical Broadcast Channel (PBCH) and includes a limited number of the most essential and most frequently transmitted parameters used to acquire other information from the cell. As shown, the MIB 400 may carry, in particular, downlink channel bandwidth information 402 (e.g., in term of Resource Blocks (RBs)), Physical Hybrid-ARQ Indicator Channel (PHICH) configuration information 404 (e.g., PHICH duration and PHICH resource), an SFN index or other identifier 406 for the RF in which the MIB 400 is transmitted, and a group of unused (reserved) bits 408 reserved for future use.

One or more of the reserved bits 408 may be used to convey DTX parameter information. In the illustrated example, information concerning the DTX cycle duration ($T_{DTX}$) 410 is included in the reserved bits 408. Where the DTX communication scheme is substantially aligned with the corresponding SFN structure, identifying the DTX cycle duration ($T_{DTX}$) 410 may be sufficient to convey the DTX cycle boundaries. For example, when DTX cycles are aligned with RF boundaries and each SFN cycle starts with an active period (i.e., SFN mod $T_{DTX}$=0), an index parameter representing one of a set of predetermined DTX cycle durations (e.g., $T_{DTX}$={2 RFs, 4 RFs, 4 RFs, 16 RFs}) may be used for the DTX cycle duration ($T_{DTX}$) 410. A set of two predetermined DTX cycle durations requires only one bit (out of the ten reserve bits for an LTE MIB), a set of four predetermined DTX cycle durations requires only two bits, etc.

In general, an LTE MIB uses a fixed schedule with a periodicity of 40 ms and repetitions made every 10 ms. More specifically, the first transmission of the MIB is scheduled in SF0 of every fourth RF (i.e., RFs for which SFN mod 4=0), and repetitions are scheduled in SF0 of all other RFs. Further, as discussed above with reference to FIG. 3, MIB signaling may be included in one or more ABRFs 310. Thus, the access terminal 120 may read MIB information even during inactive periods 206.

Figure 5:
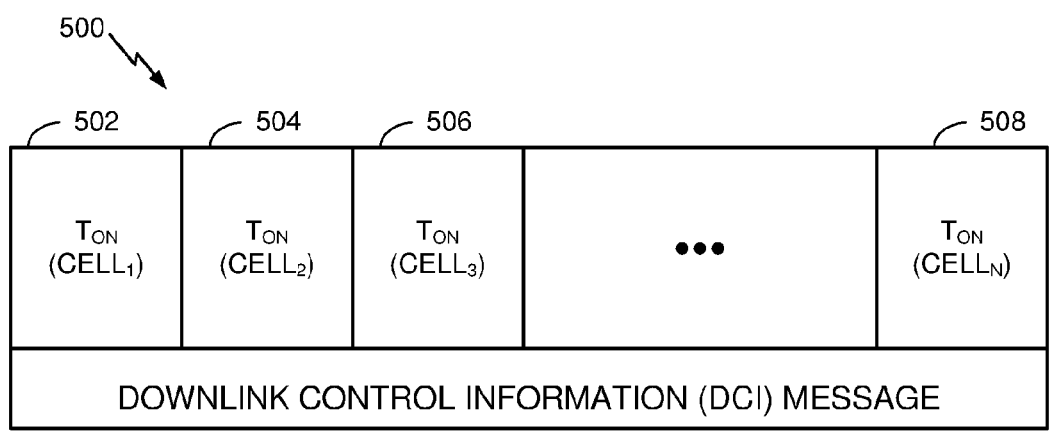
FIG. 5 illustrates an example Downlink Control Information (DCI) message adapted to convey DTX parameter information.

FIG. 5 illustrates an example DCI message adapted to convey DTX parameter information. In LTE, for example, a DCI message is transmitted on the PDCCH and is used to indicate a resource assignment for one Radio Network Temporary Identifier (RNTI). The access terminal 120 may attempt to decode DCI messages that are received on the PDCCH in either UE-specific or common PDCCH search spaces.

In the illustrated example, the DCI message 500 includes active period duration ($T_{ON}$) information for N cells (Cell$_1$ 502, Cell$_2$ 504, Cell$_3$506, . . . Cell$_N$ 508). Where the DTX cycle duration ($T_{DTX}$) is signaled separately (e.g., via MIB signaling as described above with reference to FIG. 4) and the active period duration ($T_{ON}$) is aligned with RF boundaries, an index parameter representing one of a set of predetermined active period duration ($T_{ON}$) values as a fraction of the DTX cycle duration ($T_{DTX}$) may be used (e.g., $T_{ON}=\{1/16, 1/8, 1/4, 3/8, 1/2, 5/8, 3/4, 1\}$). A set of four predetermined active period duration values requires only two bits, a set of eight predetermined active period duration values requires only three bits, etc.

The DCI message 500 may be sent on one or more different DCI "formats" used in LTE in PDCCH. As an example, DCI format 1C (DCI-1C), which is defined for compact scheduling of a Physical Downlink Shared Channel (PDSCH) codeword, may be repurposed to convey an active period duration ($T_{ON}$) index. In LTE, up to five serving cells are permitted and a DCI-1C message contains 15 bits. Thus, different active period duration ($T_{ON}$) information for each of the permitted number of serving cells may be included in a DCI-1C message with an allocation of three bits, allowing for a set of eight predetermined active period duration values to be conveyed in this manner. It will be appreciated, however, that other numbers of cells and bits may be used as desired (e.g., a fewer number of cells, a larger set of values, a common set of values for different cells, etc.). Based on a guaranteed active period of at least the first RF in each DTX cycle, most access terminals will be able to quickly read the DCI-1C message and identify the DTX communication pattern.

It will be appreciated that in some systems, DCI-1C messages may be utilized for other purposes as well and that accommodations may be made for the co-existence of both techniques. For example, DCI-1C messages may also be used to signal dynamic TDD configuration information. Enhancements to LTE TDD for downlink (DL)/uplink (UL) Interference Management and Traffic Adaptation (eIMTA) specify an adaptive change to the LTE-TDD configuration based on current traffic conditions. Typically, the eIMTA_RNTI is signaled in DCI-1C in each of SF0, SF1, SF4, and SF5. Multiplexing and reusing one of these (e.g., SF5) for the active period duration ($T_{ON}$) allows both sets of information to be conveyed.

Turning to system detection, it may be more efficient to perform system acquisition on each of the secondary RAT channels (e.g., each of the twenty channels defined by Wi-Fi) rather than to run a traditional frequency scan over the entire medium 132. Context awareness can be used to trigger/prohibit scanning and acquisition based on location, time, access terminal mobility state, etc.

Figure 6:
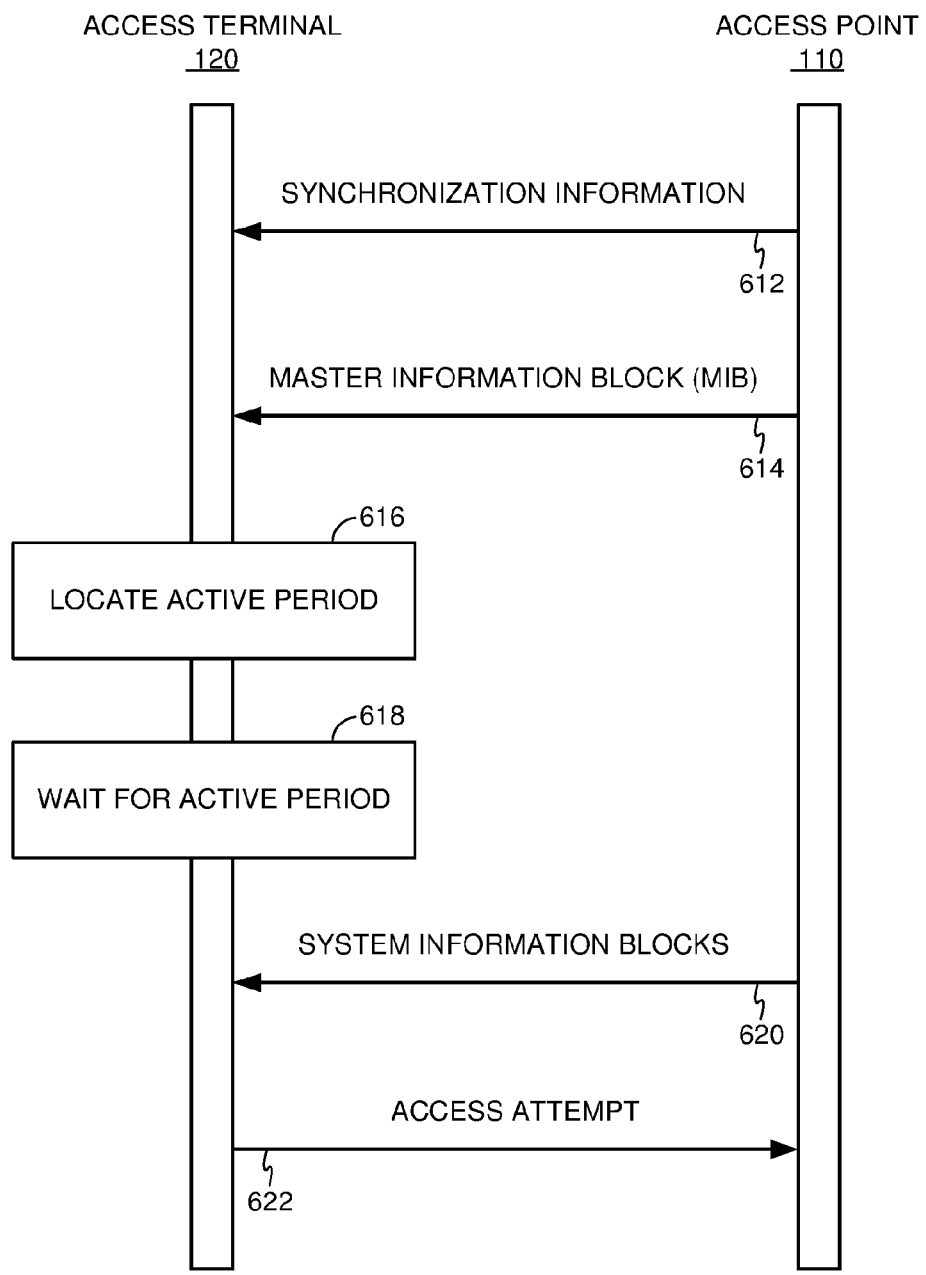
FIG. 6 is a signaling flow diagram illustrating system acquisition in a DTX communication scheme.

FIG. 6 is a signaling flow diagram illustrating system acquisition in a DTX communication scheme. In this example, the access point 110 is providing service via a PCell operating in accordance with a DTX communication scheme (e.g., of the type described above with reference to FIG. 3) and the access terminal 120 is performing system acquisition.

As shown, the access terminal 120 initially receives and processes system synchronization information (e.g., PSS/SSS signaling) (signal 612). With reference to FIG. 3, the PSS/SSS signaling, for example, may be present in only the first Half Frame (HF) of a given ABRF (e.g., in SF0-SF1) rather than in both HFs (e.g., in SF0-SF1 and SF5-SF6) of a normal RF. Soft combining may be used to reconstruct the PSS/SSS signaling over multiple ABRFs as necessary. From this, the access terminal 120 acquires the Physical Cell Identifier (PCI), time slot, and frame synchronization of the access point 110, which enables the access terminal 120 to locate and decode other information.

In particular, the access terminal 120 is able to decode the MIB broadcasted by the access point 110 (signal 614). As discussed above, the MIB may be used to provide information regarding DTX cycle timing (e.g., the DTX cycle duration ($T_{DTX}$)), among other information (e.g., SFN). Accordingly, based on the decoded MIB, the access terminal 120 may locate the start of the next DTX cycle (e.g., the RF where SFN mod $T_{DTX}=0$), and hence, the next guaranteed active period (block 616).

At the next guaranteed active period (block 618), the access terminal 120 may decode SIB-1, which is guaranteed to be available, and, based on the information in SIB-1, decode SIB-2, and so on (signal 620). Decoding of SIB-1 and SIB-2 allows the access terminal 120 to begin accessing the system (e.g., via a Random Access Channel (RACH)) (signal 622).

Figure 7:
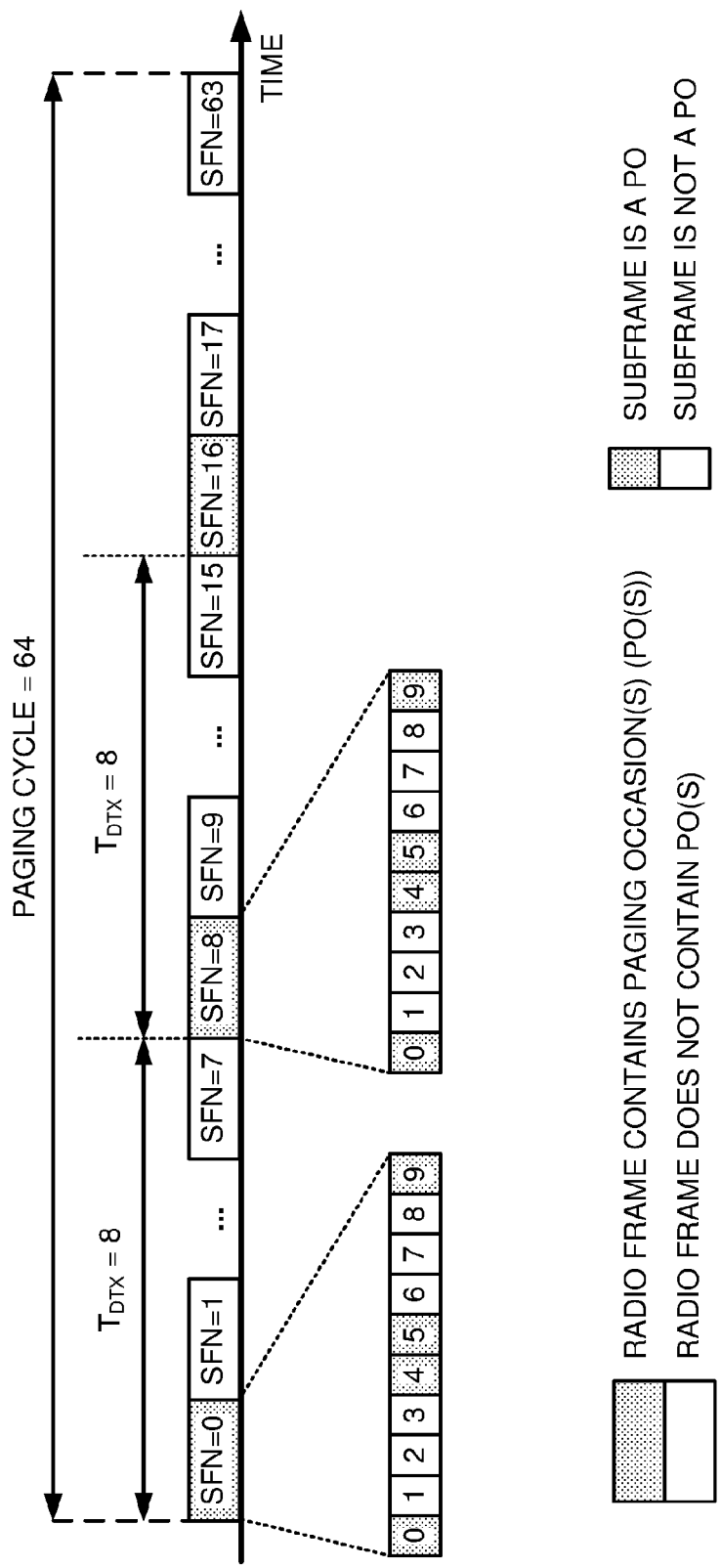
FIG. 7 is a timing diagram illustrating an example paging structure adapted for use in a DTX communication scheme.

FIG. 7 is a timing diagram illustrating an example paging structure adapted for use in a DTX communication scheme. In this example, the DTX cycle duration is set to 8 RFs (i.e., $T_{DTX}=8$) and the paging cycle is set to 64 RFs for illustration purposes.

A Paging Frame (PF) is an RF that may contain one or multiple Paging Occasion (PO) subframes for sending a paging message used for paging and system information change notification. In LTE, for example, the location of a PF for the access terminal 120 (an LTE UE, in this example) is defined by certain paging parameters according to the following equation:

$$\text{SFN mod } T=(T/N)^*(\text{UE\_ID mod } N) \quad \text{(Eq. 1)}$$

Here, T=min(UE specific Discontinuous Reception (DRX) value, Default Paging Cycle) and represents the minimum DRX cycle as between the UE-specific DRX cycle and the default, cell-specific DRX cycle. Meanwhile, N=min(T, nB) and represents the number of paging frames in a paging cycle of the UE, where nB=$\{2T, T, T/2, T/4, T/8, T/16, T/32\}$. Finally, UE_ID=International Mobile Subscriber Identity (IMSI) mod 1024 and is used as a pseudo-random spacing value. The Default Paging Cycle and nB parameters are broadcast in system information (SIB-2).

In order to ensure that paging is scheduled during an active period, one or more of the paging parameters may be specially configured based on the DTX cycling parameters to align all PFs with the first RF of a DTX cycle, which is guaranteed to be an active period. For example, the nB parameter may be set to ($T/T_{DTX}$) to match the PF periodicity with the DTX cycle. In the illustrated example, where the DTX cycle duration is set to 8 RFs (i.e., $T_{DTX}=8$) in FIG. 7, nB may be set to nB=T/8, and hence, N=min(T, T/8)=T/8. Accordingly, the location of a given PF will be at SFN mod T=8*(UE_ID mod T/8)=a multiple of 8, which aligns with the beginning of DTX cycles where the cell is guaranteed to be active even if it is unloaded.

Figure 8:
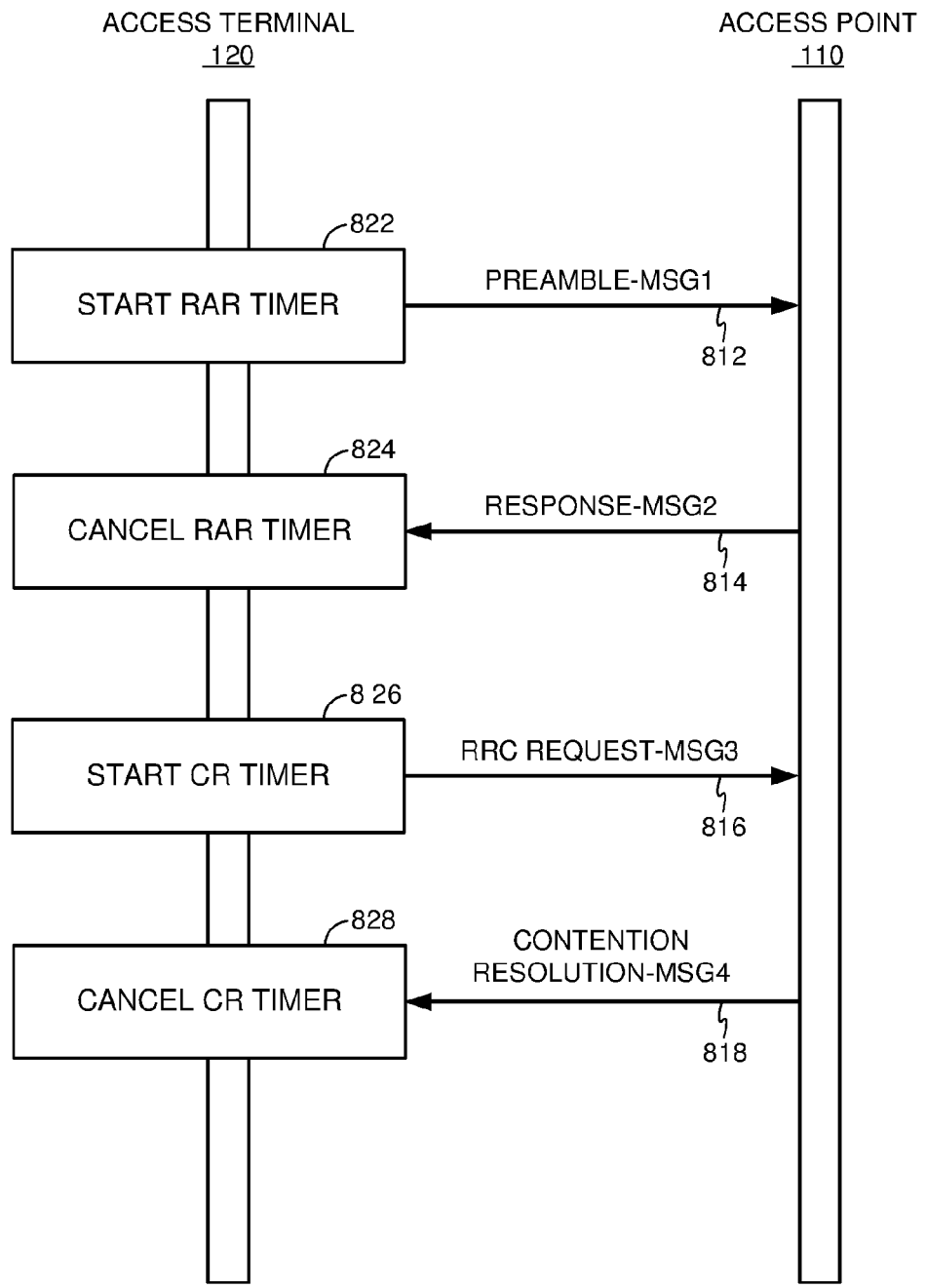
FIG. 8 is a signaling flow diagram illustrating an example random access procedure that may be adapted for use with a DTX communication scheme.

FIG. 8 is a signaling flow diagram illustrating an example random access procedure that may be adapted for use with a DTX communication scheme. In this example, the access point 110 is providing service via a PCell operating in accordance with a DTX communication scheme (e.g., of the type described above with reference to FIG. 3) and the access terminal 120 is performing a contention-based random access procedure to gain access to cell resources.

Contention-based random access may be performed as a generally four part procedure. Initially, the access terminal 120 transmits a random access preamble (Msg1 812), the format and PRACH time domain resource allocation of which may be indicated by a PRACH-Configuration Index parameter. In conjunction with transmitting Msg1, the access terminal 120 sets a Random Access Response (RAR) timer (e.g., in accordance with a ra-Response Window Size parameter) (block 822) and waits for an RAR message (Msg2 814) on the PDCCH. Upon receiving Msg2 before the RAR timer expires, the access terminal 120 cancels the RAR timer (block 824). Otherwise, the access terminal 120 retransmits Msg1 812.

In Msg2, the access terminal 120 receives the timing alignment value, resources (uplink grant), and temporary identifier (C-RNTI) to be utilized in transmitting an RRC request (Msg3 816). In conjunction with transmitting Msg3, the access terminal 120 sets a Contention Resolution (CR) timer (e.g., in accordance with a mac-Contention Resolution Timer parameter) (block 826).

After transmission of Msg3, the access terminal 120 monitors the PDCCH for a CR message containing its temporary identifier (Msg4 818) until expiration of the CR timer. In conjunction with successfully decoding Msg4, the access terminal 120 cancels the CR timer (block 828).

In order to ensure that random access is coordinated with the DTX communication pattern employed, one or more of the random access parameters may be specially configured based on the DTX cycling parameters to constrain PRACH (time) resources and access point responses to only fall within active periods. For example, the access point may configure PRACH resources to only fall in the first half of odd frames (e.g., via the prach-Configuration Index satisfying T0=2 (odd frames only) and T1=0 (located in the first HF)), configure the RAR window to cover SF0 of the first active period in the following RF (e.g., via the ra-Response Window Size), configure the contention resolution window to cover multiple active periods (e.g., via the mac-Contention Resolution Timer), and so on.

Figure 9:
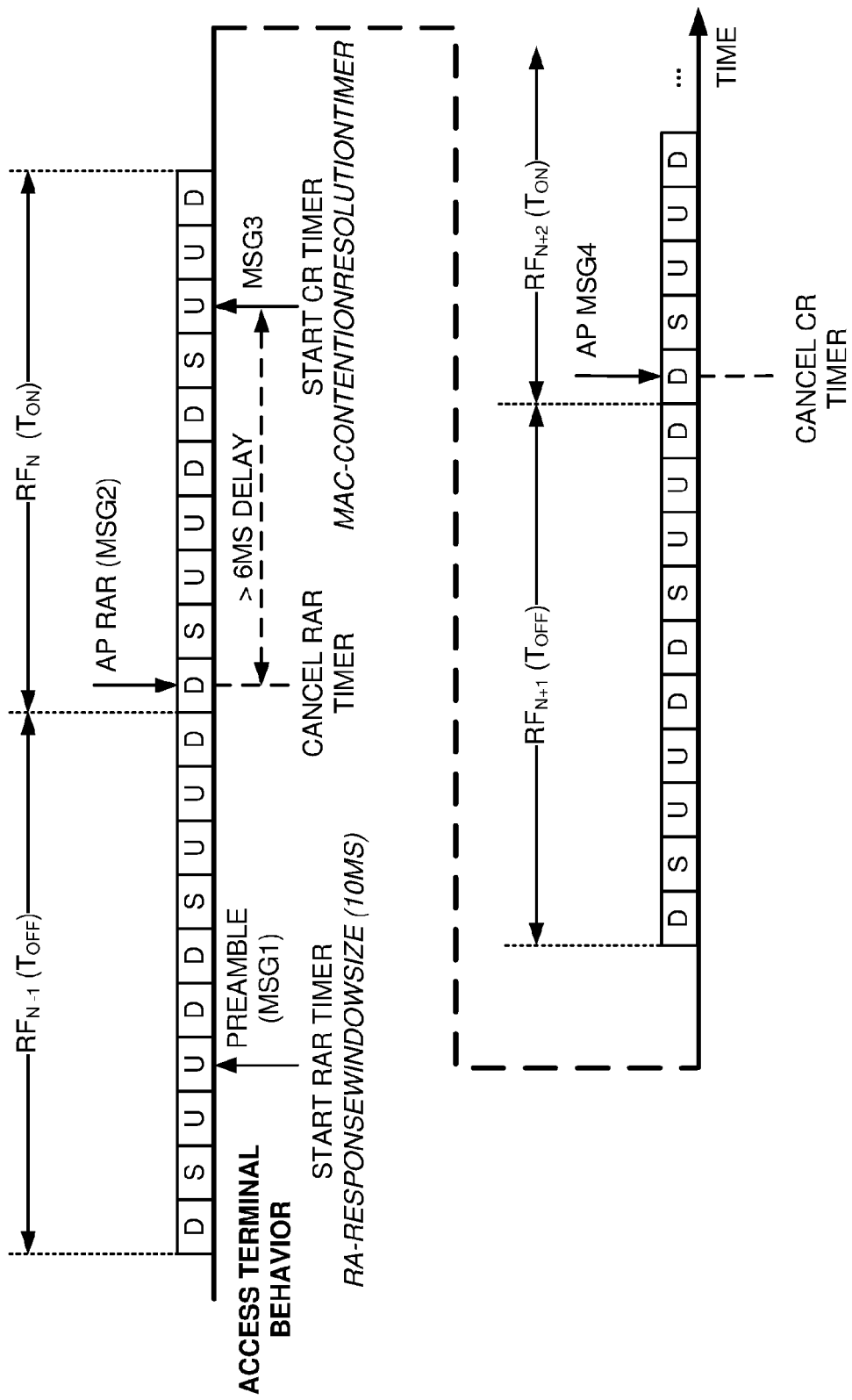
FIG. 9 is a timing diagram illustrating an example adaptation of the random access procedure of FIG. 8 for operation with a DTX communication scheme.

FIG. 9 is a timing diagram illustrating an example adaptation of the random access procedure of FIG. 8 for operation with a DTX communication scheme. In this example, the DTX cycle duration is set to 2 RFs (i.e., $T_{DTX}=2$), the duty cycle is set to ½ (i.e., $T_{ON}=1$), and the TDD configuration is set to '1' for illustration purposes. Further, the prach-Configuration Index=1 (i.e., corresponding to a (0, 2, 0, 1) configuration that specifies odd radio frames, the first HF, and the second UL subframe), the RAR window parameter ra-Response Window Size=10 ms, and the Msg3 contention window parameter mac-Contention Resolution Timer=32 ms.

As shown, the timing diagram of FIG. 9 covers a full DTX cycle corresponding to $RF_N$ (an active period) through $RF_{N+1}$ (an inactive period) as well as the preceding $RF_{N-1}$ (an inactive period) and the succeeding $RF_{N+2}$ (an active period). In order to ensure that the RAR Msg2 is delivered in $RF_N$ (an active period), the access terminal 120 sends its preamble Msg1 in the preceding $RF_{N-1}$ (an inactive period), during the second UL subframe as specified by the prach-Configuration Index. Because the RAR window parameter ra-Response Window Size is set to a relatively long value (10 ms being an illustrative example), the RAR Msg2 delivered in SF0 of $RF_N$ (an active period) is guaranteed to be within the RAR window.

As discussed in more detail above with reference to FIG. 8, upon receiving the RAR Msg2, the access terminal 120 may send the RRC Msg3 (e.g., later in $RF_N$) and set its CR timer. Because the CR timer parameter mac-Contention Resolution Timer is set to a relatively long value (32 ms being an illustrative example), the access terminal 120 may wait for another active period at $RF_{N+2}$ to receive the CR Msg4 without the CR timer expiring due to the delay introduced by $RF_{N+1}$ (an inactive period).

In some designs, the access point 110 may opportunistically extend the active period to finish the RACH procedure (e.g., adapting over all duty cycles and taking into account any increase in $T_{ON}$).

Returning to FIG. 3 and the discussion above concerning various signaling measurements by the access terminal 120 (e.g., RRM/RLM), these measurements may be coordinated with DTX operation to ensure that they are not corrupted by performance during inactive periods when the requisite signaling (e.g., LTE PSS/SSS and/or CRS) may be disabled. Corruption of such measurements may impact not only channel selection, but also other measurement-based procedures, including access terminal-assisted radio resource and power managing, PCI collision detection, other self-organizing network algorithms, mobility, tracking loop procedures, etc., thereby detrimentally affecting proper operation of the system.

To facilitate coordination, the access terminal 120 may utilize the DTX parameters broadcast by the access point 110 via its serving cell (e.g., via MIB and PDCCH signaling as discussed in more detail above). For example, for measurements on its serving cell, the access terminal 120 may utilize its knowledge of the DTX cycle ($T_{DTX}$) and active period duration ($T_{ON}$) to run all measurement loops only during active periods and during one or more designated subframes (e.g., SF0) in ABRFs of the inactive periods. For intra-frequency neighbor cells or inter-frequency measurements, although the active period duration ($T_{ON}$) may not be known per se, the access terminal 120 may utilize its knowledge of the synchronized DTX cycle ($T_{DTX}$) to perform measurements during minimum guaranteed transmission periods (e.g., the first RF of each DTX cycle and/or SF0).

Returning again to FIG. 3, for relatively short DTX cycles, it may not be feasible to assume that a given Hybrid Automatic Repeat Request (HARQ) procedure will be able to be completed within a single active period. Although DL HARQ is asynchronous and can be continued over multiple DTX cycles, UL HARQ is generally synchronous and may end up overlapping with an intervening inactive period.

Figure 10:
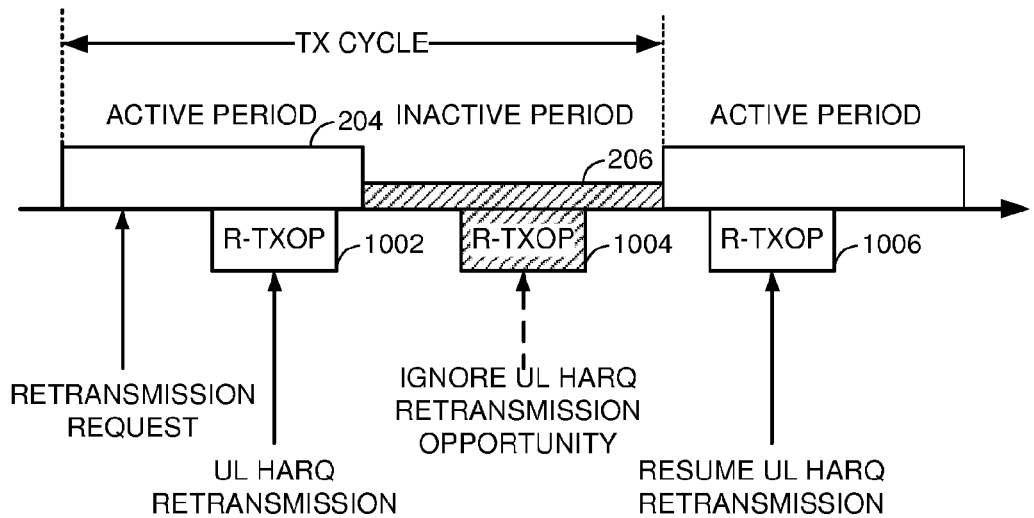
FIG. 10 is a timing diagram illustrating an adaptation of UpLink (UL) Hybrid Automatic Repeat Request (HARQ) for operation with a DTX communication scheme.

FIG. 10 is a timing diagram illustrating an adaptation of UL HARQ for operation with a DTX communication scheme. As in FIG. 2, during active periods 204 of communication, primary RAT transmission on the communication medium 132 is enabled. During inactive periods 206, primary RAT transmission on the communication medium 132 is disabled to allow secondary RAT operations and to conduct measurements.

As shown, the access terminal 120 may receive from the access point 110 (e.g., during one of the active periods 204) a request for retransmission of one or more packets, and may initiate performance of an UL HARQ procedure for retransmitting the packets. The UL HARQ procedure may be adapted based on the DTX communication pattern 200. In particular, UL HARQ may be modified to be effectively asynchronous, similar to DL HARQ where the access point 110 provides instructions to the access terminal 120 regarding which HARQ process to use during each subframe for which resources are allocated. In general, for synchronous HARQ, transmissions of a packet may be sent in subframes that are known a priori by a transmitter and a receiver. For asynchronous HARQ, however, transmissions of a packet may be scheduled and sent in any subframes. An asynchronous-like HARQ procedure may be used to increase flexibility for operation in the context of the DTX communication pattern 200 by avoiding retransmission during every subframe.

To implement an asynchronous-like HARQ scheme while reducing the changes to device behavior, however, the access terminal 120 may be configured to operate synchronously while ignoring retransmission opportunities that may be scheduled during inactive periods. Retransmission may instead continue in the next retransmission opportunity during the next active period 204. That is, the access terminal 120 may determine a set of retransmission opportunities for a synchronous HARQ retransmission schedule for retransmitting the requested packets, but only retransmit the packets over a subset of less than all of the retransmission opportunities based on the DTX communication pattern 200. Both the access terminal 120 and access point 110 may be configured to understand and expect this retransmission pattern.

As shown in FIG. 10, in this example, the access terminal 120 may refrain from retransmitting the requested packets during any retransmission opportunities scheduled during one of the inactive periods 206 of the DTX communication pattern 200. For example, the access terminal 120 may retransmit a first portion of the packets during a first scheduled retransmission opportunity (R-TXOP) 1002 overlapping with a first active period 204 of the DTX communication pattern. The access terminal 120 may then refrain from retransmitting a second portion of the packets during a second scheduled retransmission opportunity 1004 at least partially overlapping with an inactive period 206 of the DTX communication pattern 200. The access terminal 120 may instead retransmit the second portion of the packets during a third scheduled retransmission opportunity 1006 overlapping with a second active period 204 of the DTX communication pattern 200.

As discussed in more detail above, the access terminal 120 may determine timing information relating to a location of the active periods 204 and inactive periods 206 of the DTX communication pattern 200 in various ways, and this timing information may be used in coordinating the retransmission procedure. Further, the access terminal may receive a scheduling notification identifying the set of retransmission opportunities (e.g., during an active period of the DTX communication pattern).

In other designs, the access terminal 120 may flush the UL buffer upon reaching an inactive period, instead resending the requested packet as a new grant. In still other designs, HARQ parameters may be constrained to force decoding in one or a few (e.g., 1-2) transmissions while targeting a low Packet Error Rate (PER). These may be alternative and simpler solutions, but may also impact UL capacity.

As a further enhancement, access terminal synchronization with a DTX communication pattern may be coordinated with other communication system operations, such as (connected mode) Discontinuous Reception (DRX, or cDRX).

Figure 11:
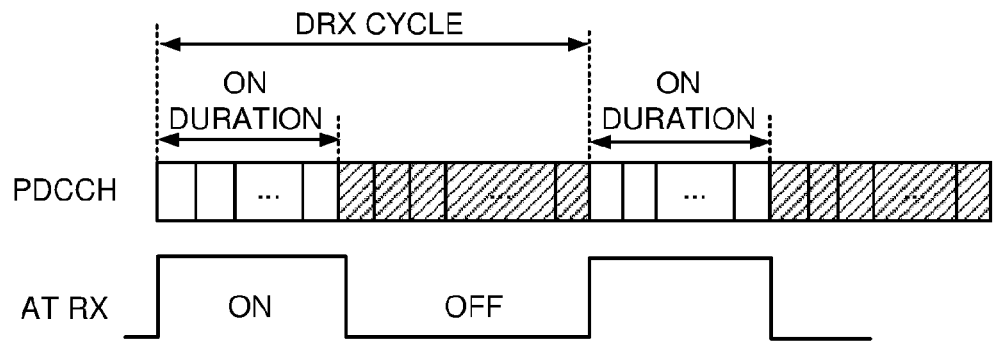
FIG. 11 illustrates an example Discontinuous Reception (DRX) communication mode.

FIG. 11 illustrates an example DRX communication mode, which may be used to communicate with the access terminal 120 for applications that do not require continuous reception. As shown, during certain predetermined or negotiated times, the receive functionality (RX) of the primary RAT transceiver 140 of the access terminal 120 primary receiver is turned ON (e.g., in a connected state), while at other times, it is turned OFF (referred to as a DRX gap) and the access terminal 120 enters a low power state. During the ON duration of a given DRX cycle, the primary RAT transceiver 140 may monitor a corresponding control channel or the like (illustrated as an LTE PDCCH) to identify DL data. The access point 110 may control the DRX operation and schedule communications accordingly.

To avoid crowding on select resources, access terminals associated with the access point 110 may be divided into groups and different groups may monitor the PDCCH at different times. A drxStartOffset parameter may be used to specify different offset subframes for different groups where their respective ON durations are designated to start.

In general, DRX allows the access terminal 120 to conserve battery power by monitoring control channels only at configurable or predetermined intervals rather than continuously. It may therefore be advantageous to specially configure one or more DRX parameters (e.g., drxStartOffset) to substantially synchronize DRX operation with DTX operation (e.g., at least to guarantee that each DRX ON duration overlaps with a minimum active period, $T_{ON,min}$).

Figure 12:
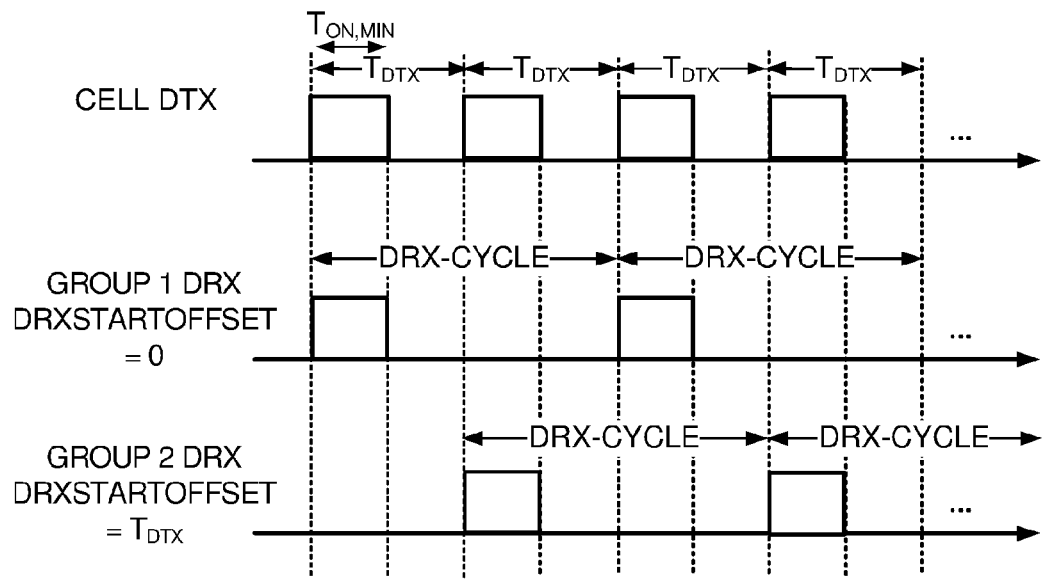
FIG. 12 is a timing diagram illustrating an example DRX structure adapted for use in a DTX communication scheme.

FIG. 12 is a timing diagram illustrating an example DRX structure adapted for use in a DTX communication scheme. In this example, the DTX cycle duration is set to 2 RFs (i.e., $T_{DTX}$=20 ms), the duty cycle is set to ½ (i.e., $T_{ON}$=10 ms), the minimum active period is set to 1 RF (i.e., $T_{ON,min}$=10 ms), and the TDD configuration is set to '1' for illustration purposes. Further, the DRX cycle is set to twice the DTX cycle ($2*T_{DTX}$) and the DRX ON duration (on Duration) is set to 6 psf (10 ms), where psf (PDCCH-Subframe) refers to a subframe with PDCCH. For FDD operation, this represents any subframe, whereas for TDD operation, it represents only DL subframes and subframes including DwPTS. (Thus, 6 psf in TDD configuration 1, for example, corresponds to 10 ms.)

As shown, a set of access terminals such as access terminal 120 are divided into two groups, Group 1 and Group 2. In this example, the Group 1 and Group 2 DRX ON durations are staggered across alternating DTX cycles by setting Group 1 drxStartOffset=0 and Group 2 drxStartOffset=$T_{DTX}$. The DRX ON duration for each access terminal is aligned with $T_{ON,min}$ as a guaranteed active period.

Figure 13:
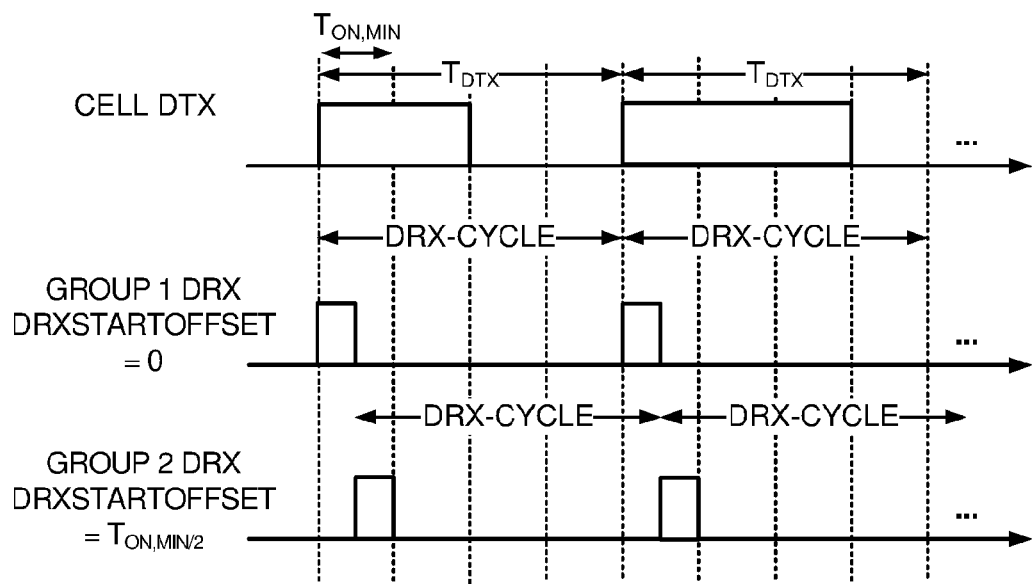
FIG. 13 is another timing diagram illustrating an example DRX structure adapted for use in a DTX communication scheme.

FIG. 13 is another timing diagram illustrating an example DRX structure adapted for use in a DTX communication scheme. In this example, the DTX cycle duration is set to 16 RFs (i.e., $T_{DTX}$=160 ms), the duty cycle is set to ½ (i.e., $T_{ON}$=80 ms), the minimum active period is set to 4 RFs (i.e., $T_{ON,min}$=40 ms), and the TDD configuration is again set to '1' for illustration purposes. Further, the DRX cycle is set to the DTX cycle ($T_{DTX}$) and the DRX ON duration (on Duration) is set to 12 psf (20 ms).

As shown, a set of access terminals such as access terminal 120 are again divided into two groups, Group 1 and Group 2. In this example, the Group 1 and Group 2 DRX ON durations are staggered within a common DTX cycle by setting Group 1 drxStartOffset=0 and Group 2 drxStartOffset=$T_{ON,min}$/2. The DRX ON duration for each access terminal is again aligned with $T_{ON,min}$ as a guaranteed active period.

As a further enhancement, in some situations the access point 110 may opportunistically switch a PCell to a DL "lite" configuration during one or more active periods to further reduce unnecessary medium utilization and interference to secondary RAT devices. For example, if there is little or no traffic on a given PCell, the access point 110 may switch the PCell to a low duty cycle DTX pattern coupled with a TDD config0 structure having minimal DL subframes.

Figure 14:
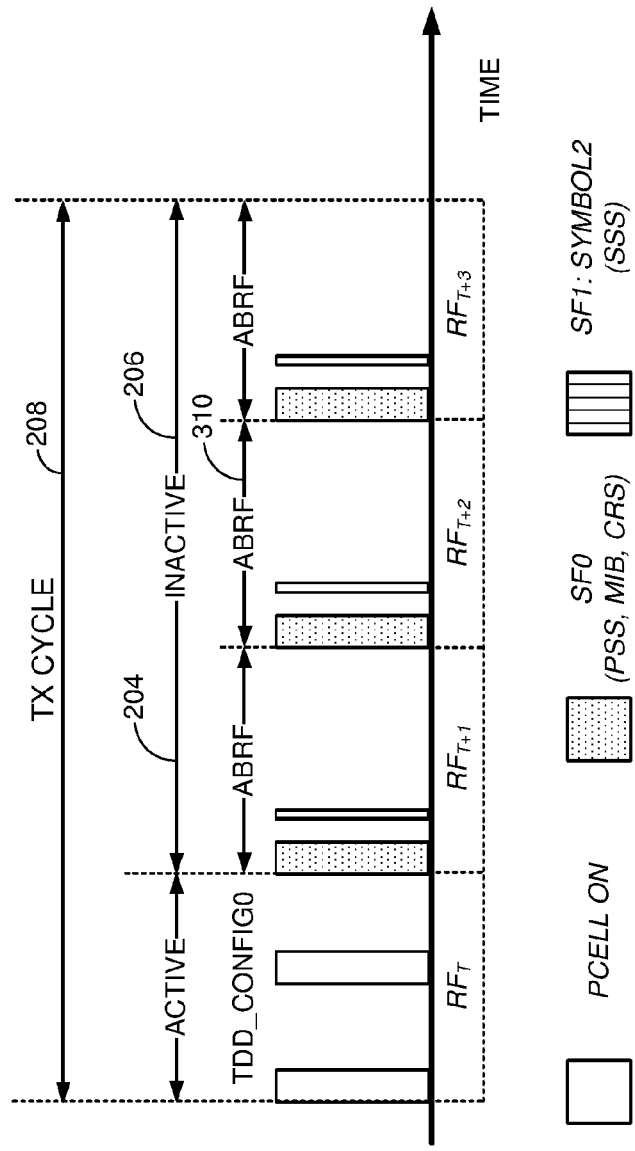
FIG. 14 illustrates an example DTX communication scheme for a PCell utilizing a DownLink (DL)-lite configuration to opportunistically reduce interference.

FIG. 14 illustrates an example DTX communication scheme for a PCell utilizing a DL-lite configuration to opportunistically reduce interference. As in FIGS. 2-3, during active periods 204 of communication, primary RAT transmission on the communication medium 132 is enabled. During inactive periods 206, primary RAT transmission on the communication medium 132 is disabled to allow secondary RAT operations and to conduct measurements, but may contain one or more ABRFs 310 to facilitate continued control signaling as appropriate.

In this example, the DTX duty cycle ($T_{ON}/T_{DTX}$) is reduced to the minimum allowable setting (i.e., $T_{ON}=T_{ON,min}$), which here is 1 RF ($T_{ON}=10$ ms) out of 4 RFs ($T_{DTX}=40$ ms). In addition, the TDD configuration is set to a minimal DL subframe structure, which here is TDD config0, having only two out of ten subframes configured for DL operation (i.e., SF0 and SF5). Thus, for the illustrated DTX cycle, this DL lite configuration utilizes a relatively small (e.g., 20% effective) transmission duty cycle, which still provides opportunities for neighbor cell measurements but reduces interference to secondary RAT devices such as Wi-Fi. Further, when the operating scenario changes (e.g., traffic increases), the access point 110 may switch out of the DL lite configuration to a higher duty cycle and/or higher DL usage structure.

The access point 110 may from time to time desire to switch the PCell for the access terminal 120. This may be for load balancing purposes, improved channel selection purposes, etc., which may be more important for standalone configurations than for supplemental downlink configurations because co-existence is more dynamic. Different approaches may be used for different types of PCell switches (e.g., PCell swap vs. PCell add), for different RRC modes (e.g., connected mode vs. idle mode access terminals), and so on. Intra-access point handover from one cell to another cell provided by the same access point may be referred to as "self-handover" or "blind handover."

Figure 15:
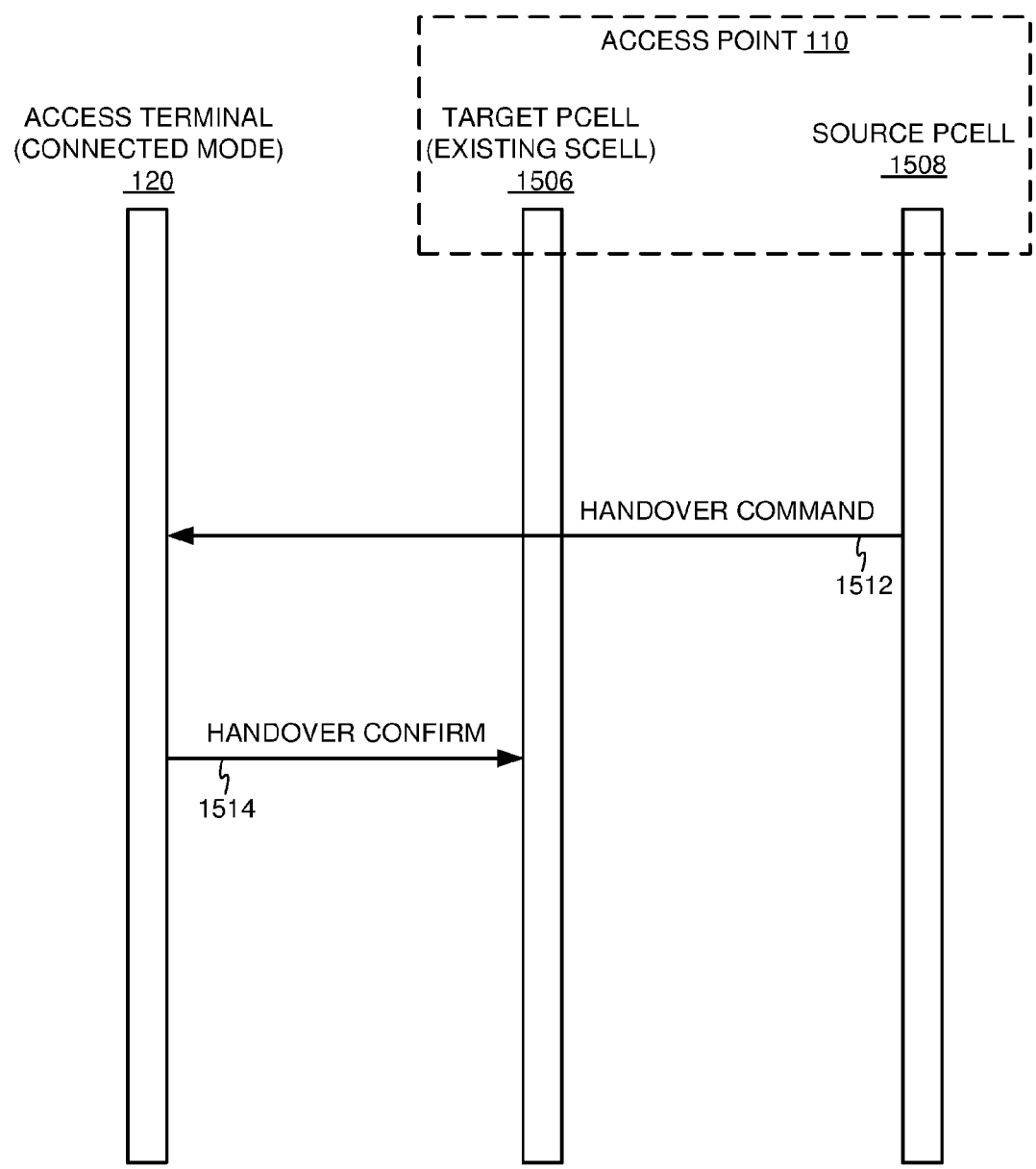
FIG. 15 is a signaling flow diagram illustrating an example Primary Cell (PCell) swap procedure for switching the PCell of a connected mode access terminal between the access terminal's existing component carriers.

FIG. 15 is a signaling flow diagram illustrating an example PCell swap procedure for switching the PCell of a connected mode access terminal between the access terminal's existing component carriers. In this example, the access point 110 is providing service to the access terminal 120 via two cells, a first (source) cell 1508 and a second (target) cell 1506.

Initially, the source cell 1508 serves as the PCell of the access terminal 120 for exchanging data and control signaling over the communication medium 132 on a corresponding component carrier, and the target cell 1506 serves as an SCell for the access terminal 120 for exchanging data signaling over the communication medium 132 on a different corresponding component carrier. However, because of load balancing and/or channel selection determinations, for example, the access point 110 may desire the access terminal 120 to reconfigure its SCell as its PCell and vice versa.

As shown, the PCell switch from the source cell 1508 to the (existing) target cell 1506 may be achieved with minimal signaling and transparency to the core network. In particular, the access point 110 may send to the access terminal 120 via the source cell 1508 a handover command 1512 instructing the access terminal 120 to reconfigure its PCell/SCell designations, and in response, the access terminal 120 may send to the access point 110 via the target cell 1506 a handover confirm message 1514. No notification to a Mobility Management Entity (MME) or the like and no packet forwarding are necessary.

Figure 16:
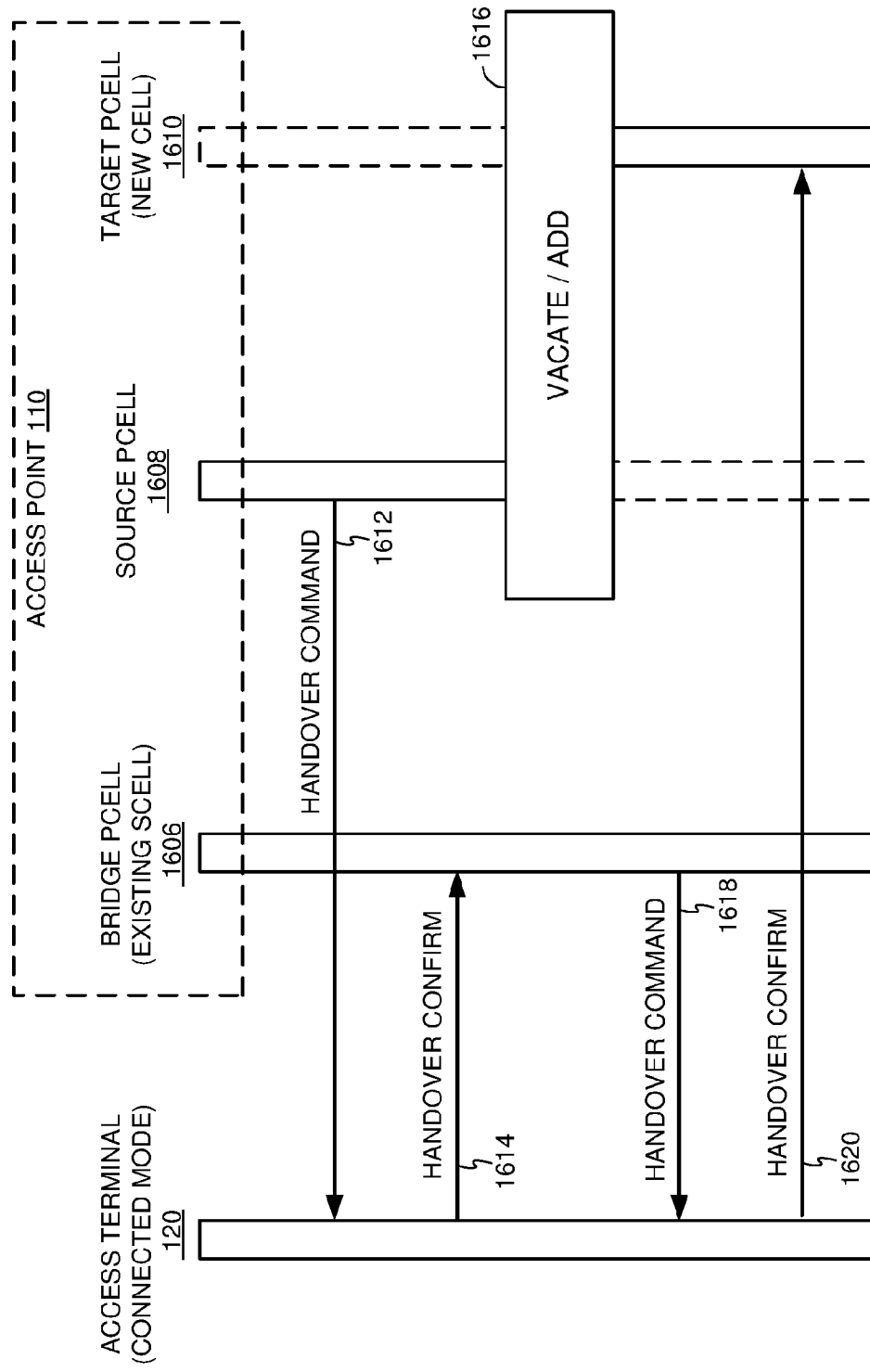
FIG. 16 is a signaling flow diagram illustrating an example PCell add procedure for switching the PCell of a connected mode access terminal from one of the access terminal's existing component carriers to a new component carrier.

FIG. 16 is a signaling flow diagram illustrating an example PCell add procedure for switching the PCell of a connected mode access terminal from one of the access terminal's existing component carriers to a new component carrier. In this example, the access point 110 is again providing service to the access terminal 120 via two cells, a first (source) cell 1608 and a second (bridge) cell 1606. The access point 110 is also capable of providing service on a third (target) cell 1610.

Initially, the source cell 1608 serves as the PCell of the access terminal 120 for exchanging data and control signaling over the communication medium 132 on a corresponding component carrier, and the bridge cell 1606 serves as an SCell for the access terminal 120 for exchanging data signaling over the communication medium 132 on a different corresponding component carrier. However, because of load balancing and/or channel selection determinations, the access point 110 may desire the access terminal 120 to switch its PCell to the target cell 1610 for exchanging data and control signaling over the communication medium 132 on a still different corresponding component carrier.

As shown, the PCell switch from the source cell 1608 to the (new) target cell 1610 may again be achieved with transparency to the core network. No notification to an MME or the like and no packet forwarding are necessary. However, because the access terminal 120 has a limited number of radio chains (two in this example), the access point 110 may utilize its SCell as an intermediary "bridge" PCell (bridge cell 1606) while it adds the (new) target cell 1610.

In particular, as in the PCell swap procedure of FIG. 15, the access point 110 may initially send to the access terminal 120 via the source cell 1608 a handover command 1612 instructing the access terminal to reconfigure its PCell/SCell designations, and in response, the access terminal 120 may send to the access point 110 via the bridge cell 1606 a handover confirm message 1614. Meanwhile, the source cell 1608 may be vacated and the target cell 1610 may be added (block 1616). Once available, the access point 110 may send to the access terminal 120 via the bridge cell 1606 a handover command 1618 instructing the access terminal to configure the target cell 1610 as its PCell, and in response, the access terminal 120 may send to the access point 110 via the target cell 1610 a handover confirm message 1620.

The load balancing and channel selection determinations triggering both the PCell swap procedure of FIG. 15 and the PCell add procedure of FIG. 16 may be performed in different ways. For example, a load balancing condition may be determined based on a traffic imbalance between different cells and their corresponding component carriers that is above a threshold. As another example, a channel selection condition may be determined based on a signal quality imbalance between different cells and their corresponding component carriers that is above a threshold. When either condition is met, the reconfiguration may be triggered.

In the examples of FIGS. 15 and 16, the access terminal for which the PCell is being reconfigured is a connected mode access terminal. For idle mode access terminals, there is no active connection and the access point 110 may not know with certainty whether such an access terminal is actually within its particular coverage area. Accordingly, rather than explicitly commanding idle mode access terminals to perform a PCell swap or add, the access point 110 may instead change cell reselection priority (e.g., via SIB-5 signaling to set priority and cell-specific offset) in order to bias the reselection procedure in favor of certain other component carriers. In addition, the access point 110 may bar the current component carrier (e.g., via SIB-1 signaling by setting cell Barred=barred and intra FreqReselection=not allowed) to expedite the search process and prioritize other existing component carriers. In LTE, for example, a barred cell cannot be accessed for cell selection/reselection purposes for 300 seconds. Informing idle mode access terminals about a PCell change may help such access terminals to monitor correct paging channels, etc.

Figure 17:
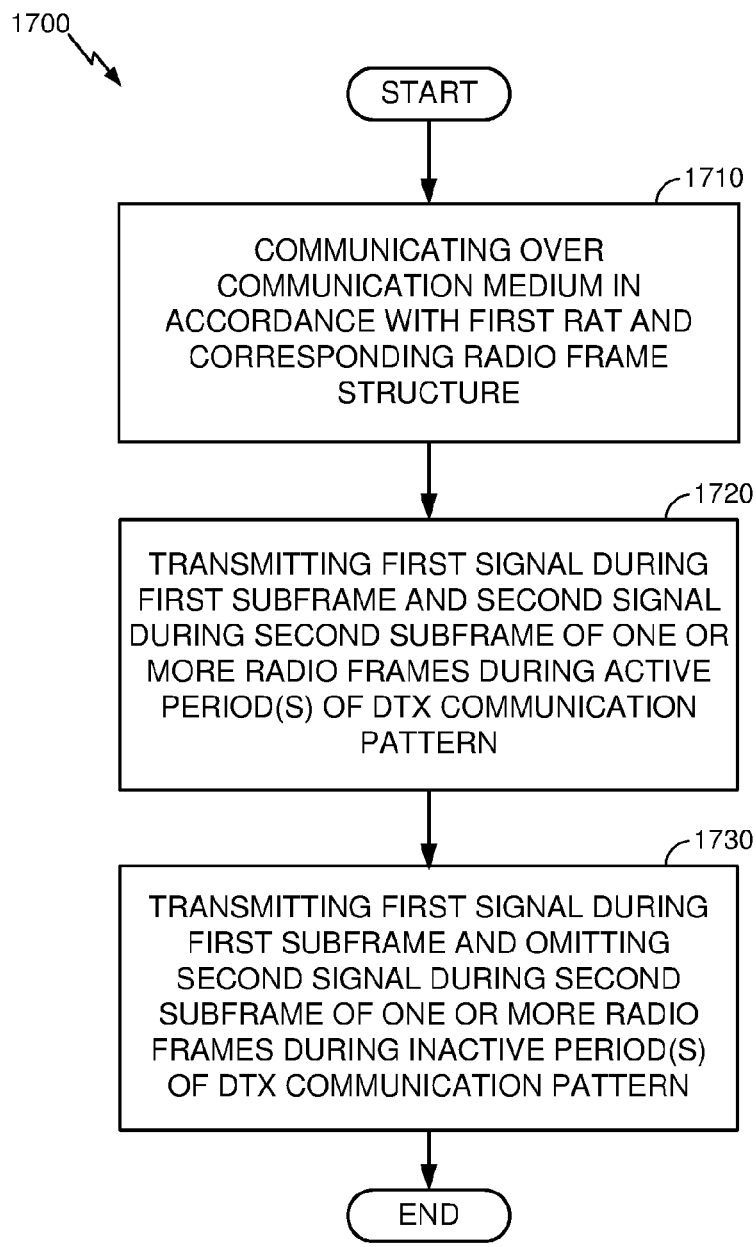
FIG. 17 is a flow diagram illustrating an example method of communication in accordance with the techniques described above.

FIG. 17 is a flow diagram illustrating an example method of communication in accordance with the techniques described above. The method 1700 may be performed, for example, by an access point (e.g., the access point 110 illustrated in FIG. 1).

As shown, the access point may communicate (block 1710) over a communication medium in accordance with a first RAT and a corresponding radio frame structure. The communicating may be performed, for example, by a transceiver such as the primary RAT transceiver 140 or the like. Each radio frame of the radio frame structure may define a first subframe for transmitting a first signal and a second subframe for transmitting a second signal. During at least one active period of a DTX communication pattern, the access point may transmit (block 1720) the first signal during the first subframe and the second signal during the second subframe of one or more radio frames. During at least one inactive period of the DTX communication pattern, the access point may transmit (block 1730) the first signal during the first subframe and omit the second signal during the second subframe of one or more radio frames. The transmitting may be performed, for example, by a transceiver at the direction of a processor and memory, such as the primary RAT transceiver 140 at the direction of the processing system 116 and memory 118 or the like.

As discussed in more detail above, the first signal may comprise, for example, a timing synchronization signal, a system acquisition signal, or a combination thereof. As an example, the first signal may comprise at least one of: a PSS signal, a CRS signal, a MIB signal, an SSS signal, or any combination thereof. As a further example, the second signal may comprise at least one of: a PCFICH signal, a PHICH signal, a PDCCH signal, a PDSCH signal, a PBCH signal, or any combination thereof.

As also discussed in more detail above, the first subframe may comprise, for example, an LTE subframe zero (SF0) or subframe one (SF1), while the second subframe may comprise, for example, an LTE subframe two (SF2), subframe three (SF3), subframe four (SF4), subframe five (SF5), subframe six (SF6), subframe seven (SF7), subframe eight (SF8), or subframe nine (SF9).

In some designs, the access point may select the second subframe for omission based on a periodicity requirement of the second signal (e.g., in comparison with a periodicity of the DTX communication pattern).

In some designs, the second subframe may be further defined for transmitting a third signal, with the access terminal additionally transmitting the third signal during the second subframe and omitting the second signal during the second subframe of one or more radio frames during at least one inactive period of the DTX communication pattern.

As desired, the access point may also monitor the communication medium for signaling in accordance with a second RAT, and set one or more parameters of the DTX communication pattern based on the monitored second-RAT signaling.

Figure 18:
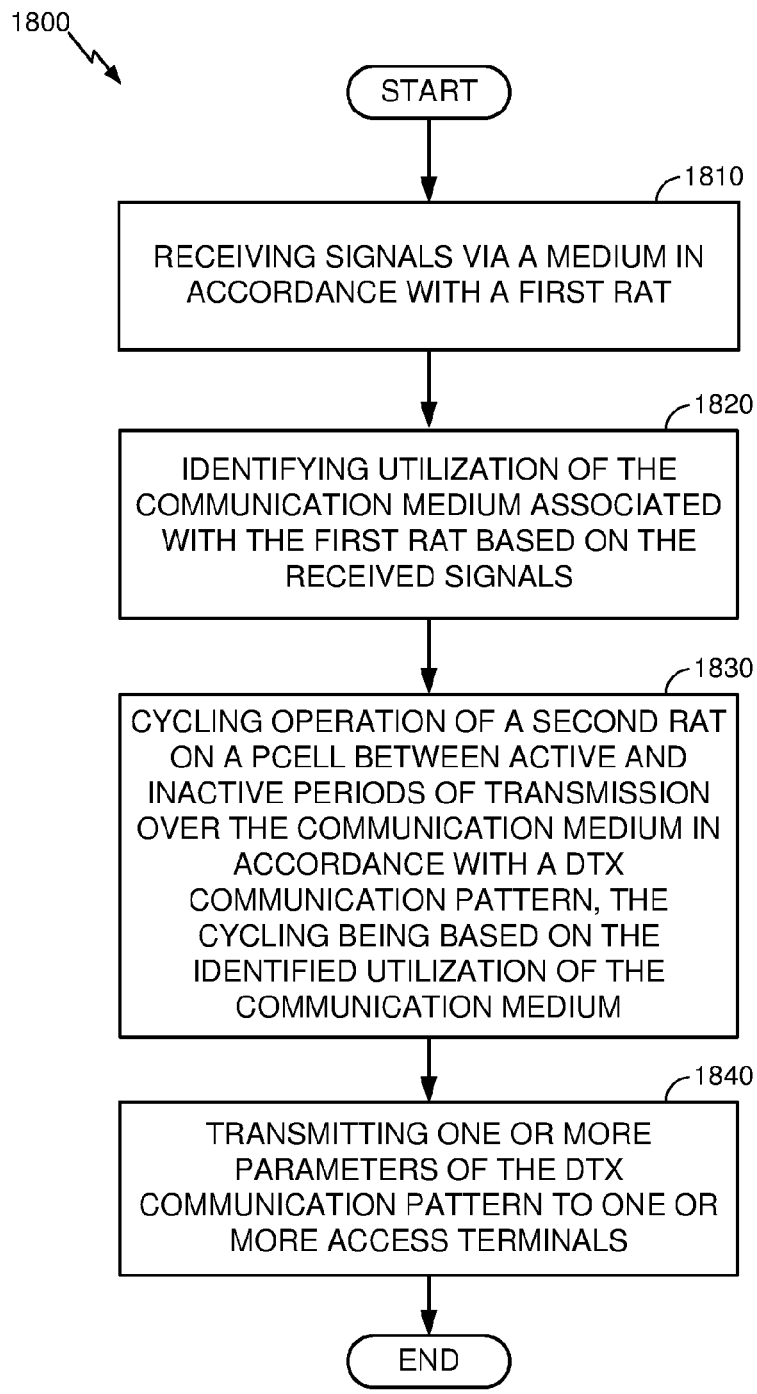
FIG. 18 is a flow diagram illustrating another example method of communication in accordance with the techniques described above.

FIG. 18 is a flow diagram illustrating another example method of communication in accordance with the techniques described above. The method 1800 may be performed, for example, by an access point (e.g., the access point 110 illustrated in FIG. 1).

As shown, the method 1800 may include the access point receiving signals via a medium using a first RAT (e.g., Wi-Fi) (block 1810). The communication medium may be an unlicensed radio frequency band shared by Wi-Fi and LTE devices, for example. The access point may then identify utilization of the communication medium associated with the first RAT based on the received signals (block 1820). Utilization of the communication medium may give an indication of an amount of interference on the communication medium.

In response, the access point may cycle operation of a second RAT (e.g., LTE) on a PCell between active and inactive periods of transmission over the communication medium in accordance with a DTX communication pattern (block 1830). The cycling may be variously based on the identified utilization of the communication medium.

As discussed in more detail above, the access point may then transmit one or more parameters of the DTX communication pattern to one or more access terminals (block 1840).

The transmitting may comprise conveying a cycle duration of the DTX communication pattern via a MIB signal. For example, the cycle duration may be encoded in one or more reserved bits of the MIB signal.

The transmitting may also comprise conveying a duty cycle of the DTX communication pattern via a DCI message. For example, the duty cycle may be encoded in one or more bits of a format 1C DCI message.

Figure 19:
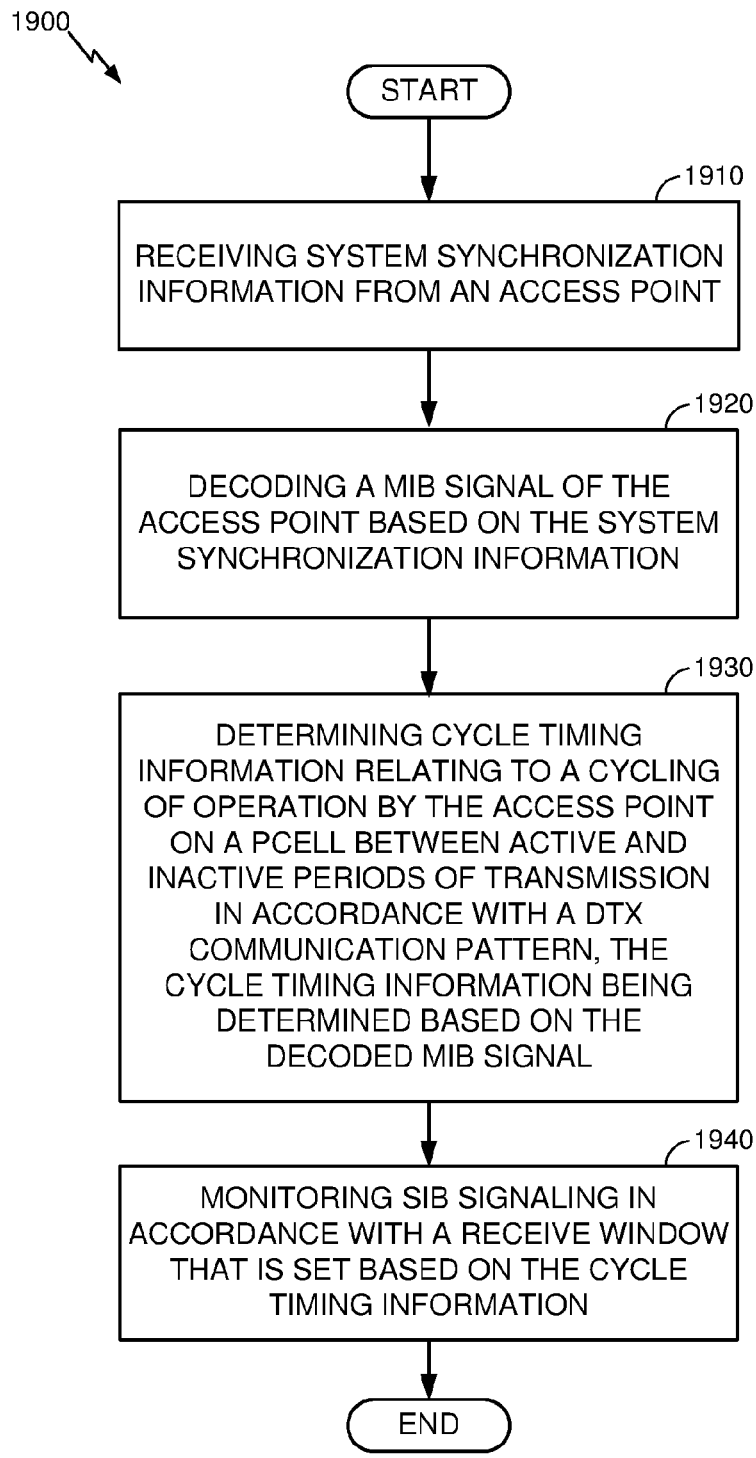
FIG. 19 is a flow diagram illustrating another example method of communication in accordance with the techniques described above.

FIG. 19 is a flow diagram illustrating another example method of communication in accordance with the techniques described above. The method 1900 may be performed, for example, by an access terminal (e.g., the access terminal 120 illustrated in FIG. 1).

As shown, the method 1900 may include the access terminal receiving system synchronization information from an access point (block 1910) and decoding a MIB signal of the access point based on the system synchronization information (block 1920). Based on the decoded MIB signal, the access terminal may determine cycle timing information relating to a cycling of operation by the access point on a PCell between active and inactive periods of transmission in accordance with a DTX communication pattern (block 1930), and monitor SIB signaling in accordance with a receive window that is set based on the cycle timing information (block 1940).

Figure 20:
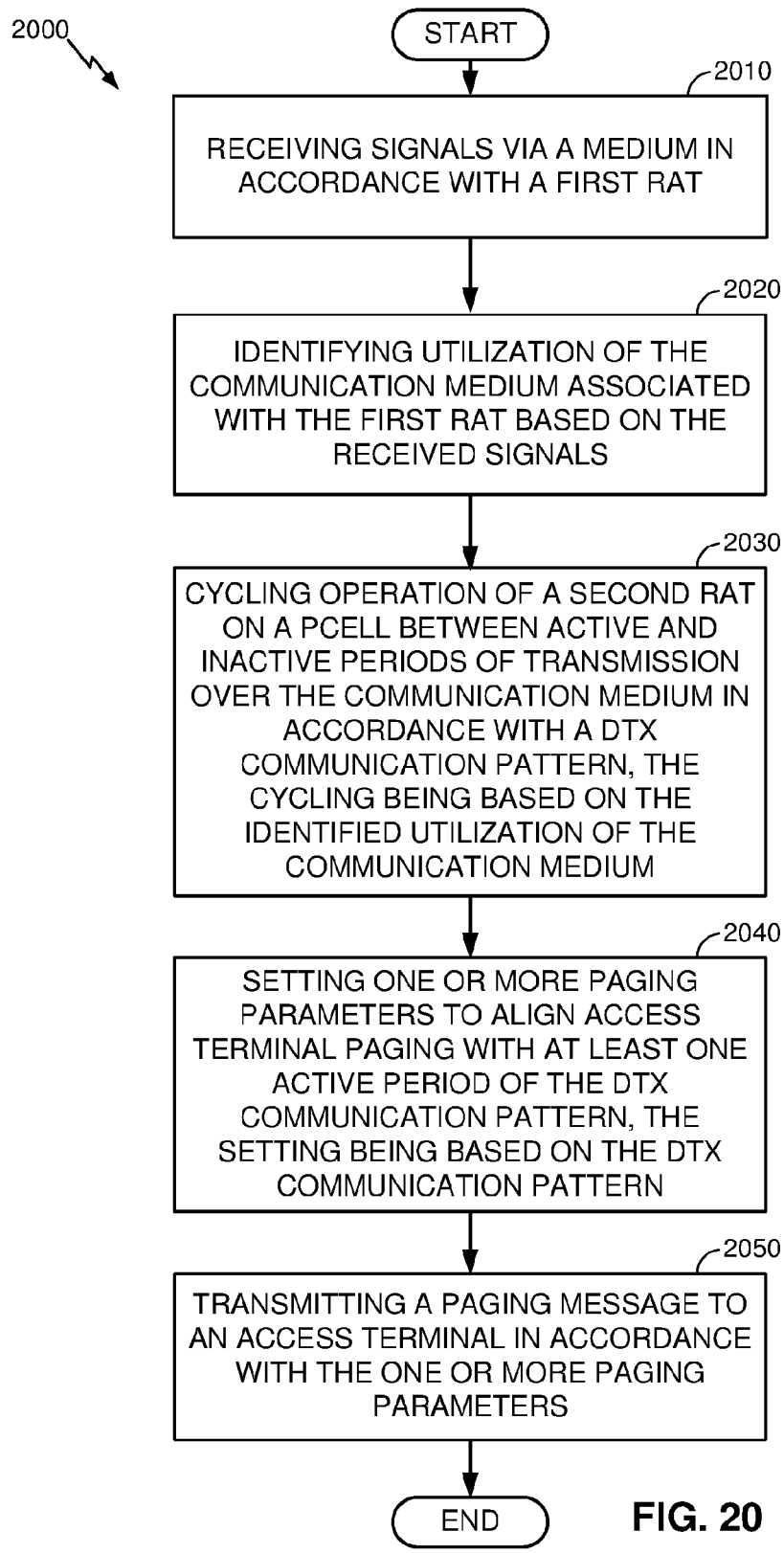
FIG. 20 is a flow diagram illustrating another example method of communication in accordance with the techniques described above.

FIG. 20 is a flow diagram illustrating another example method of communication in accordance with the techniques described above. The method 2000 may be performed, for example, by an access point (e.g., the access point 110 illustrated in FIG. 1).

As shown, the method 2000 may include the access point receiving signals via a medium using a first RAT (e.g., Wi-Fi) (block 2010). The communication medium may be an unlicensed radio frequency band shared by Wi-Fi and LTE devices, for example. The access point may then identify utilization of the communication medium associated with the first RAT based on the received signals (block 2020). Utilization of the communication medium may give an indication of an amount of interference on the communication medium.

In response, the access point may cycle operation of a second RAT (e.g., LTE) on a PCell between active and inactive periods of transmission over the communication medium in accordance with a DTX communication pattern (block 2030). The cycling may be variously based on the identified utilization of the communication medium.

As discussed in more detail above, the access point may then set one or more paging parameters to align access terminal paging with at least one active period of the DTX communication pattern, with the setting being based on the DTX communication pattern (block 2040), and transmit a paging message to an access terminal in accordance with the one or more paging parameters (block 2050).

Figure 21:
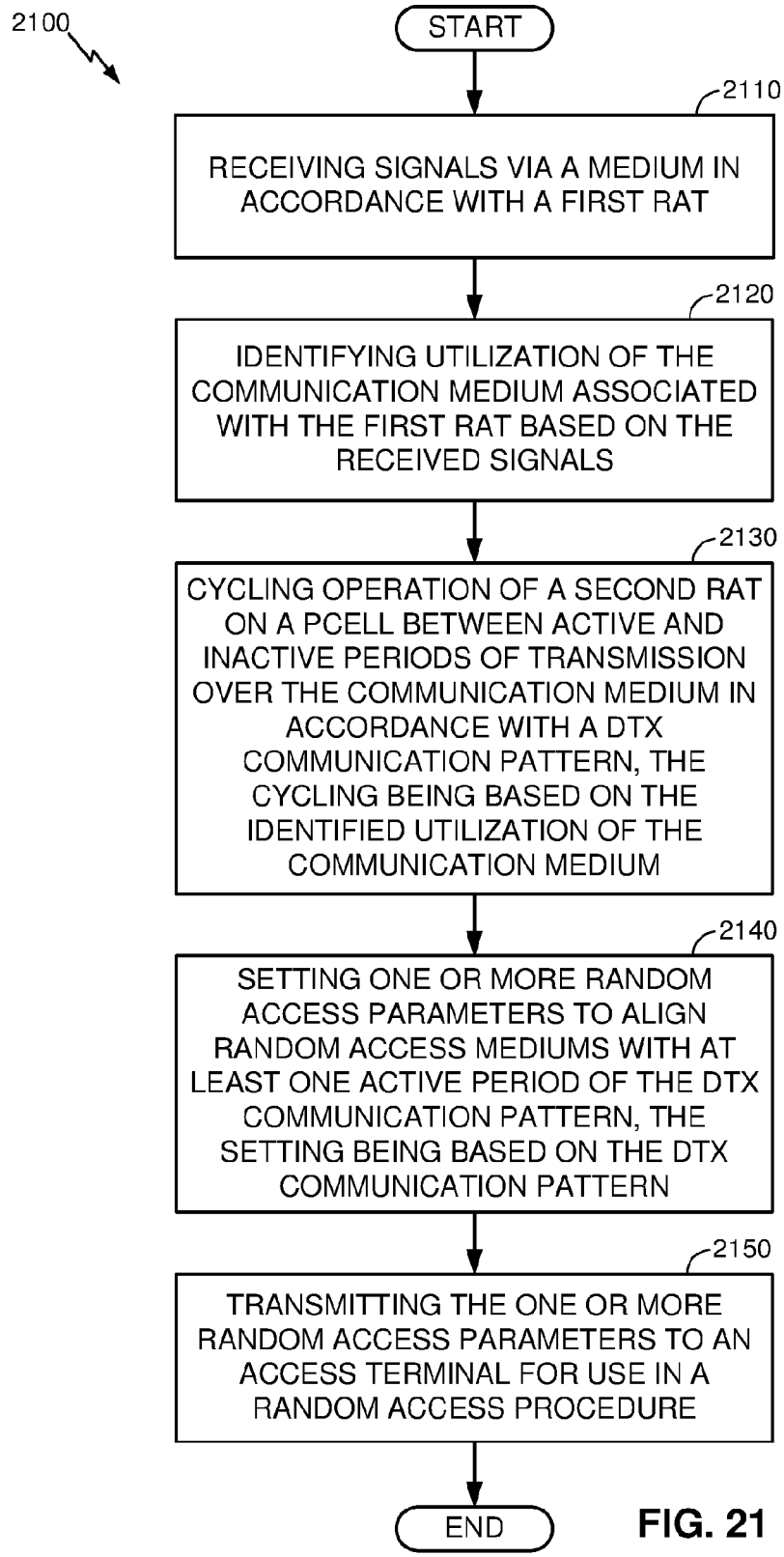
FIG. 21 is a flow diagram illustrating another example method of communication in accordance with the techniques described above.

FIG. 21 is a flow diagram illustrating another example method of communication in accordance with the techniques described above. The method 2100 may be performed, for example, by an access point (e.g., the access point 110 illustrated in FIG. 1).

As shown, the method 2100 may include the access point receiving signals via a medium using a first RAT (e.g., Wi-Fi) (block 2110). The communication medium may be an unlicensed radio frequency band shared by Wi-Fi and LTE devices, for example. The access point may then identify utilization of the communication medium associated with the first RAT based on the received signals (block 2120). Utilization of the communication medium may give an indication of an amount of interference on the communication medium.

In response, the access point may cycle operation of a second RAT (e.g., LTE) on a PCell between active and inactive periods of transmission over the communication medium in accordance with a DTX communication pattern (block 2130). The cycling may be variously based on the identified utilization of the communication medium.

As discussed in more detail above, the access point may then set one or more random access parameters to align random access opportunities with at least one active period of the DTX communication pattern, with the setting being based on the DTX communication pattern (block 2140), and transmit the one or more random access parameters to an access terminal for use in a random access procedure (block 2150).

In some designs, the method 2100 may further comprise the access point extending at least one active period of the DTX communication pattern to complete the random access procedure.

Figure 22:
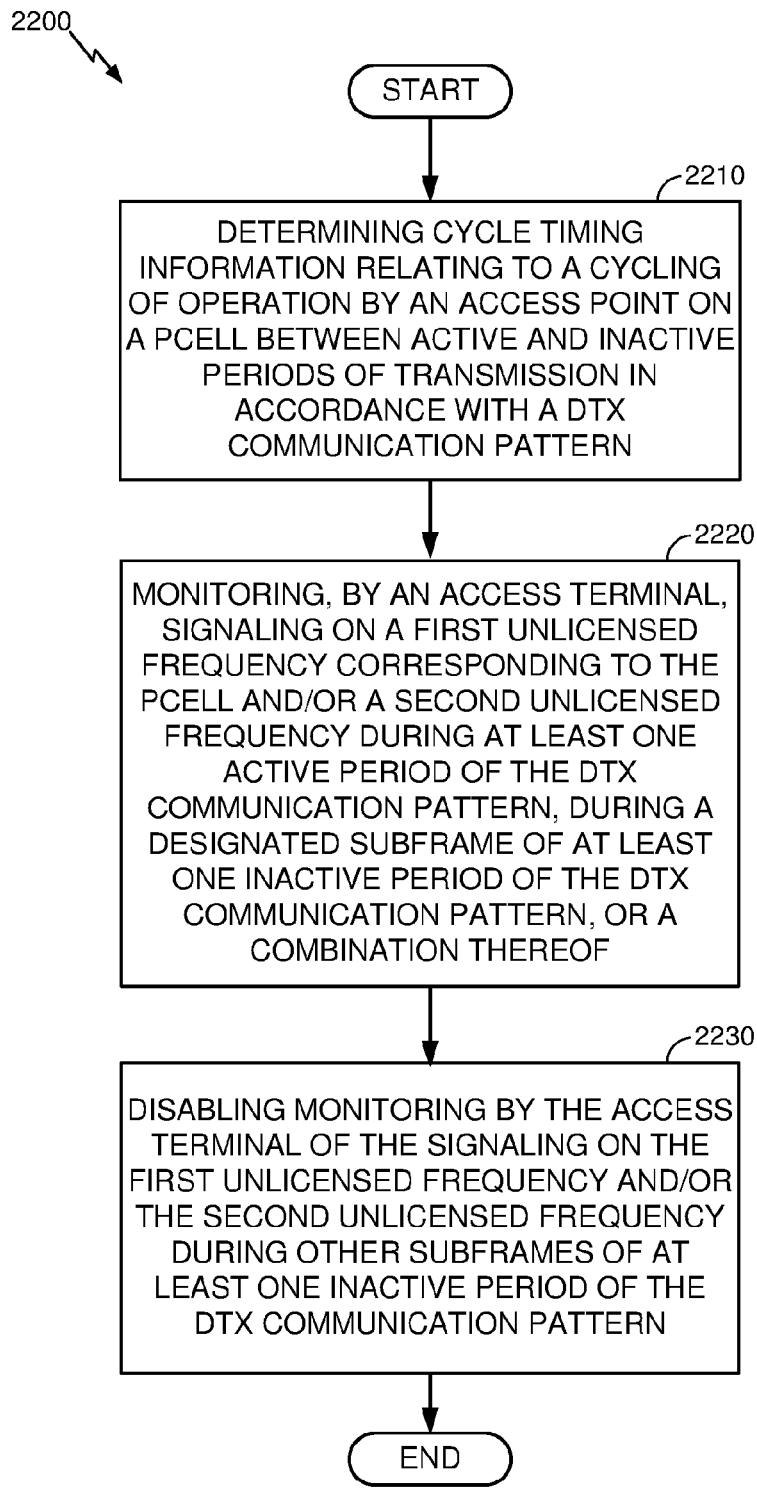
FIG. 22 is a flow diagram illustrating another example method of communication in accordance with the techniques described above.

FIG. 22 is a flow diagram illustrating another example method of communication in accordance with the techniques described above. The method 2200 may be performed, for example, by an access terminal (e.g., the access terminal 120 illustrated in FIG. 1).

As shown, the method 2200 may include the access terminal determining cycle timing information relating to a cycling of operation by an access point on a PCell between active and inactive periods of transmission in accordance with a DTX communication pattern (block 2210), and monitoring signaling (e.g., PSS, SSS, and/or CRS) on a first unlicensed frequency corresponding to the PCell (e.g., intra-frequency monitoring) and/or a second unlicensed frequency (e.g., inter-frequency monitoring) during at least one active period of the DTX communication pattern, during a designated subframe of at least one inactive period of the DTX communication pattern, or a combination thereof (block 2220). The access terminal may then disable monitoring of the signaling on the first unlicensed frequency and/or the second unlicensed frequency during other subframes of at least one inactive period of the DTX communication pattern (block 2230).

Figure 23:
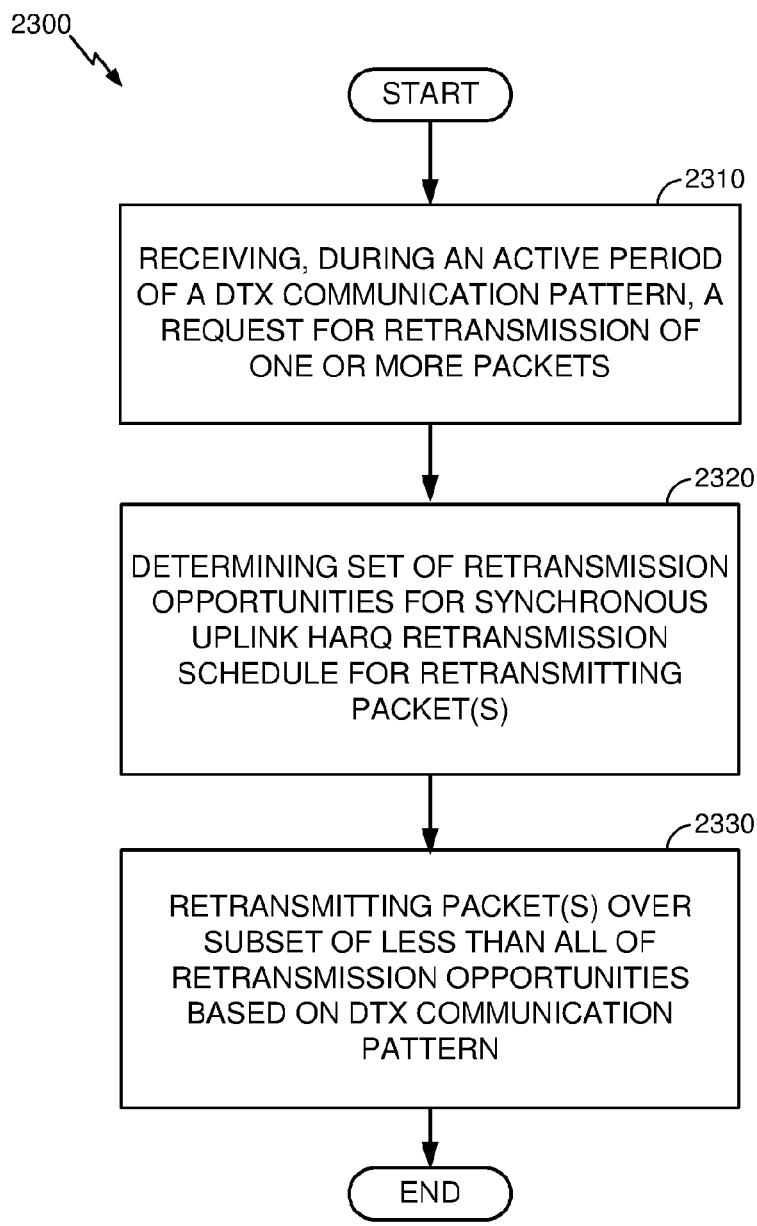
FIG. 23 is a flow diagram illustrating another example method of communication in accordance with the techniques described above.

FIG. 23 is a flow diagram illustrating another example method of communication in accordance with the techniques described above. The method 2300 may be performed, for example, by an access terminal (e.g., the access terminal 120 illustrated in FIG. 1).

As shown, the access terminal may receive (block 2310), during an active period of a DTX communication pattern defining active and inactivate periods of communication over a communication medium in accordance with a first RAT, a request for retransmission of one or more packets. The receiving may be performed, for example, by a transceiver such as the primary RAT transceiver 140 or the like. The access terminal may determine (block 2320) a set of retransmission opportunities for a synchronous uplink HARQ retransmission schedule for retransmitting the one or more packets. The determining may be performed, for example, by a processor and memory such as the processing system 116 and the memory 118 or the like. The access terminal may then retransmit (block 2330) the one or more packets over a subset of less than all of the retransmission opportunities based on the DTX communication pattern. The retransmitting may be performed, for example, by a transceiver such as the primary RAT transceiver 140 or the like.

As discussed in more detail above, the retransmitting (block 2330) may comprise, for example, refraining from retransmitting the one or more packets during a retransmission opportunity scheduled during one of the inactive periods of the DTX communication pattern. As an example, the retransmitting may comprise retransmitting a first portion of the one or more packets during a first scheduled retransmission opportunity overlapping with a first active period of the DTX communication pattern; refraining from retransmitting a second portion of the one or more packets during a second scheduled retransmission opportunity at least partially overlapping with an inactive period of the DTX communication pattern; and retransmitting the second portion of the one or more packets during a third scheduled retransmission opportunity overlapping with a second active period of the DTX communication pattern.

In some designs, the access terminal may determine timing information relating to a location of one or more of the active and inactive periods of the DTX communication pattern, with the retransmitting (block 2330) being based on the timing information.

In some designs, the access terminal may receive a scheduling notification identifying the set of retransmission opportunities. The scheduling notification may be received during an active period of the DTX communication pattern.

As an example, the communication medium here may comprise at least a portion of an unlicensed band of radio frequencies, and the first RAT may comprise LTE technology sharing the communication medium with a second RAT comprising Wi-Fi Technology.

Figure 24:
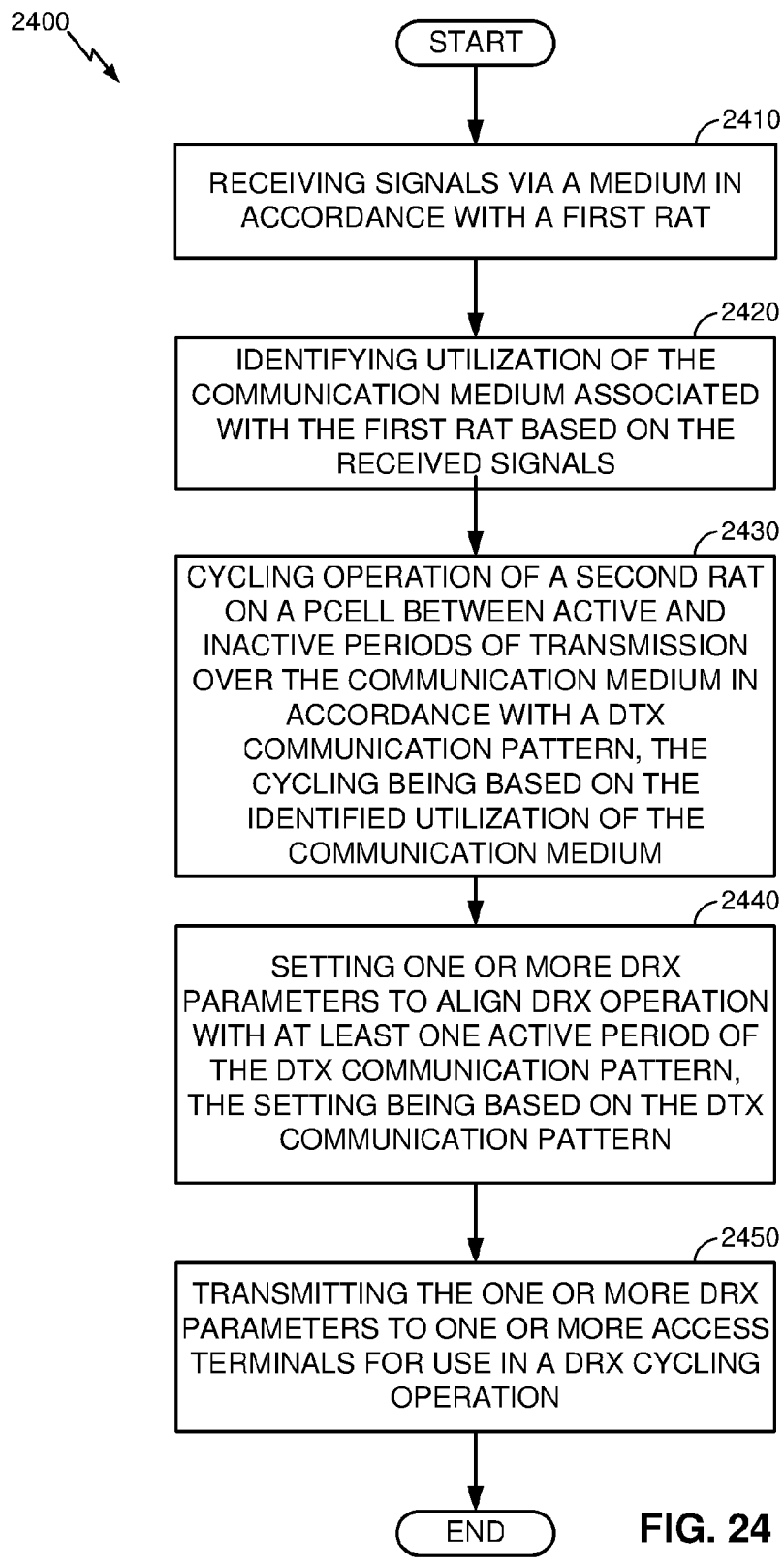
FIG. 24 is a flow diagram illustrating another example method of communication in accordance with the techniques described above.

FIG. 24 is a flow diagram illustrating another example method of communication in accordance with the techniques described above. The method 2400 may be performed, for example, by an access point (e.g., the access point 110 illustrated in FIG. 1).

As shown, the method 2400 may include the access point receiving signals via a medium using a first RAT (e.g., Wi-Fi) (block 2410). The communication medium may be an unlicensed radio frequency band shared by Wi-Fi and LTE devices, for example. The access point may then identify utilization of the communication medium associated with the first RAT based on the received signals (block 2420). Utilization of the communication medium may give an indication of an amount of interference on the communication medium.

In response, the access point may cycle operation of a second RAT (e.g., LTE) on a PCell between active and inactive periods of transmission over the communication medium in accordance with a DTX communication pattern (block 2430). The cycling may be variously based on the identified utilization of the communication medium.

As discussed in more detail above, the access point may then set one or more DRX parameters to align DRX operation with at least one active period of the DTX communication pattern, with the setting being based on the DTX communication pattern (block 2440), and transmit the one or more DRX parameters to one or more access terminals for use in a DRX cycling operation (block 2450). The one or more access terminals may comprise, for example, a first group of access terminals and a second group of access terminals, the first and second groups being transmitted respective DRX parameters to align them with a minimum active period of the DTX communication pattern and to stagger them within or between cycles of the DTX communication pattern.

Figure 25:
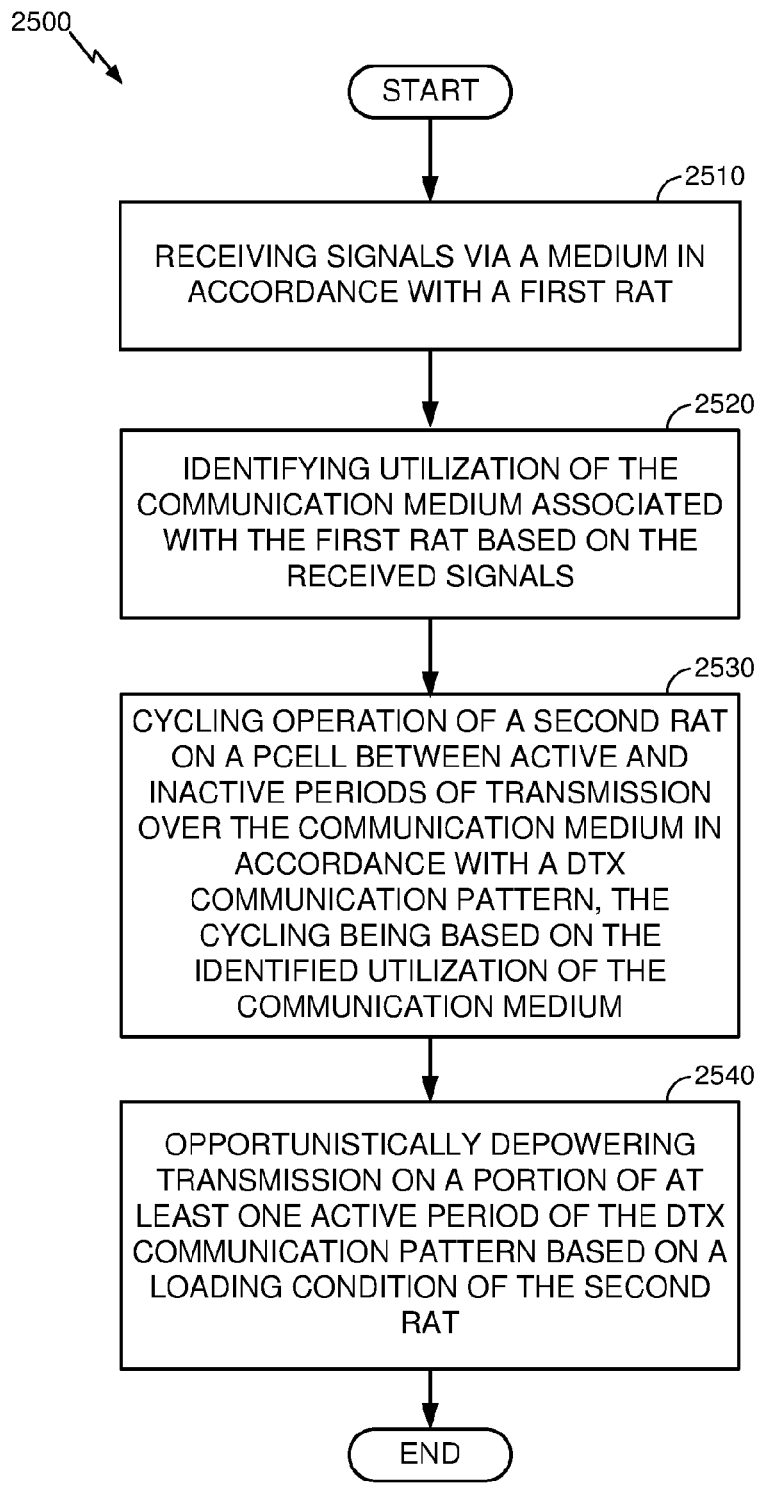
FIG. 25 is a flow diagram illustrating another example method of communication in accordance with the techniques described above.

FIG. 25 is a flow diagram illustrating another example method of communication in accordance with the techniques described above. The method 2500 may be performed, for example, by an access point (e.g., the access point 110 illustrated in FIG. 1).

As shown, the method 2500 may include the access point receiving signals via a medium using a first RAT (e.g., Wi-Fi) (block 2510). The communication medium may be an unlicensed radio frequency band shared by Wi-Fi and LTE devices, for example. The access point may then identify utilization of the communication medium associated with the first RAT based on the received signals (block 2520). Utilization of the communication medium may give an indication of an amount of interference on the communication medium.

In response, the access point may cycle operation of a second RAT (e.g., LTE) on a PCell between active and inactive periods of transmission over the communication medium in accordance with a DTX communication pattern (block 2530). The cycling may be variously based on the identified utilization of the communication medium.

As discussed in more detail above, the access point may then opportunistically depower transmission on a portion of at least one active period of the DTX communication pattern based on a loading condition of the second RAT (block 2540). The method 2500 may further comprise, in some designs, opportunistically setting one or more cycling parameters of the DTX communication pattern based on the loading condition of the second RAT.

Figure 26:
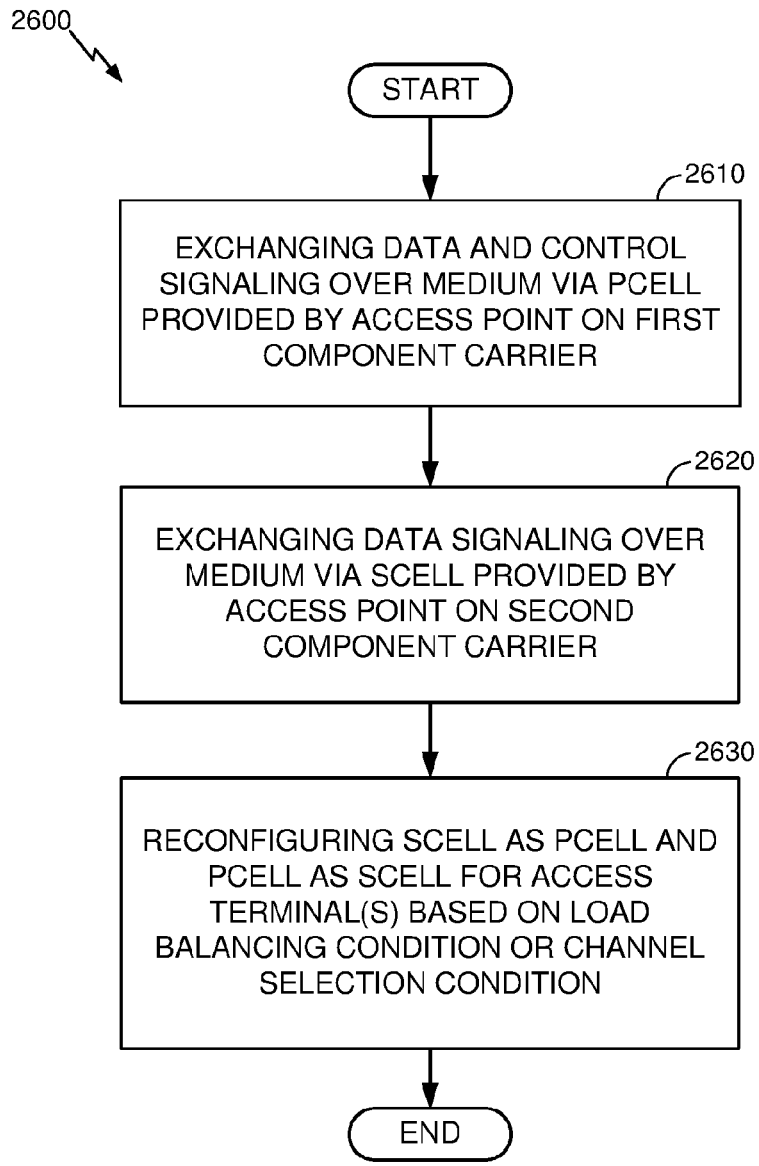
FIG. 26 is a flow diagram illustrating another example method of communication in accordance with the techniques described above.

FIG. 26 is a flow diagram illustrating another example method of communication in accordance with the techniques described above. The method 2600 may be performed, for example, by an access point (e.g., the access point 110 illustrated in FIG. 1).

As shown, the access point may exchange (block 2610) data and control signaling over the communication medium via a PCell provided by the access point on a first component carrier. The access point may also exchange (block 2620) data signaling over the communication medium via an SCell provided by the access point on a second component carrier. The exchanging may be performed, for example, by a transceiver such as the primary RAT transceiver 140 or the like. The access point may then reconfigure (block 2630) the SCell as the PCell and the PCell as the SCell for one or more access terminals based on a load balancing condition or a channel selection condition. The reconfiguring may be performed, for example, by a transceiver at the direction of a processor and memory, such as the primary RAT transceiver 140 at the direction of the processing system 116 and memory 118 or the like.

As discussed in more detail above, the reconfiguring (block 2630) may comprise, for example, sending via the first component carrier a handover command; receiving via the second component carrier a handover confirmation; and switching PCell operation to the second component carrier. As an alternative, the reconfiguring (block 2630) may comprise, for example, switching the reconfigured PCell to a third component carrier, such as by sending via the first component carrier a handover command; receiving via the second component carrier a handover confirmation; switching PCell operation to the second component carrier; sending via the second component carrier a handover command; receiving via the third component carrier a handover confirmation; and switching PCell operation to the third component carrier. In this example, the reconfiguring (block 2630) may further comprise, for example, vacating the first component carrier in response to receiving the handover confirmation; and occupying the third component carrier in response to the vacating of the first component carrier.

In some designs, the access point may determine the load balancing condition based on a traffic imbalance between the first component carrier and one or more other component carriers that is above a threshold, and trigger the reconfiguring in response to the determining. In other designs, the access point may determine the channel selection condition based on a signal quality imbalance between the first component carrier and one or more other component carriers that is above a threshold, and trigger the reconfiguring in response to the determining.

In some designs, the access point may adjust one or more cell reselection parameters to bias cell reselection in favor of a target PCell, and signal the one or more adjusted cell reselection parameters to an idle mode access terminal to trigger a cell reselection of the target PCell.

For convenience, the access point 110 and the access terminal 120 are shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

FIGS. 27-36 provide alternative illustrations of apparatuses for implementing the access point 110 and/or the access terminal 120 represented as a series of interrelated functional modules.

Figure 27:
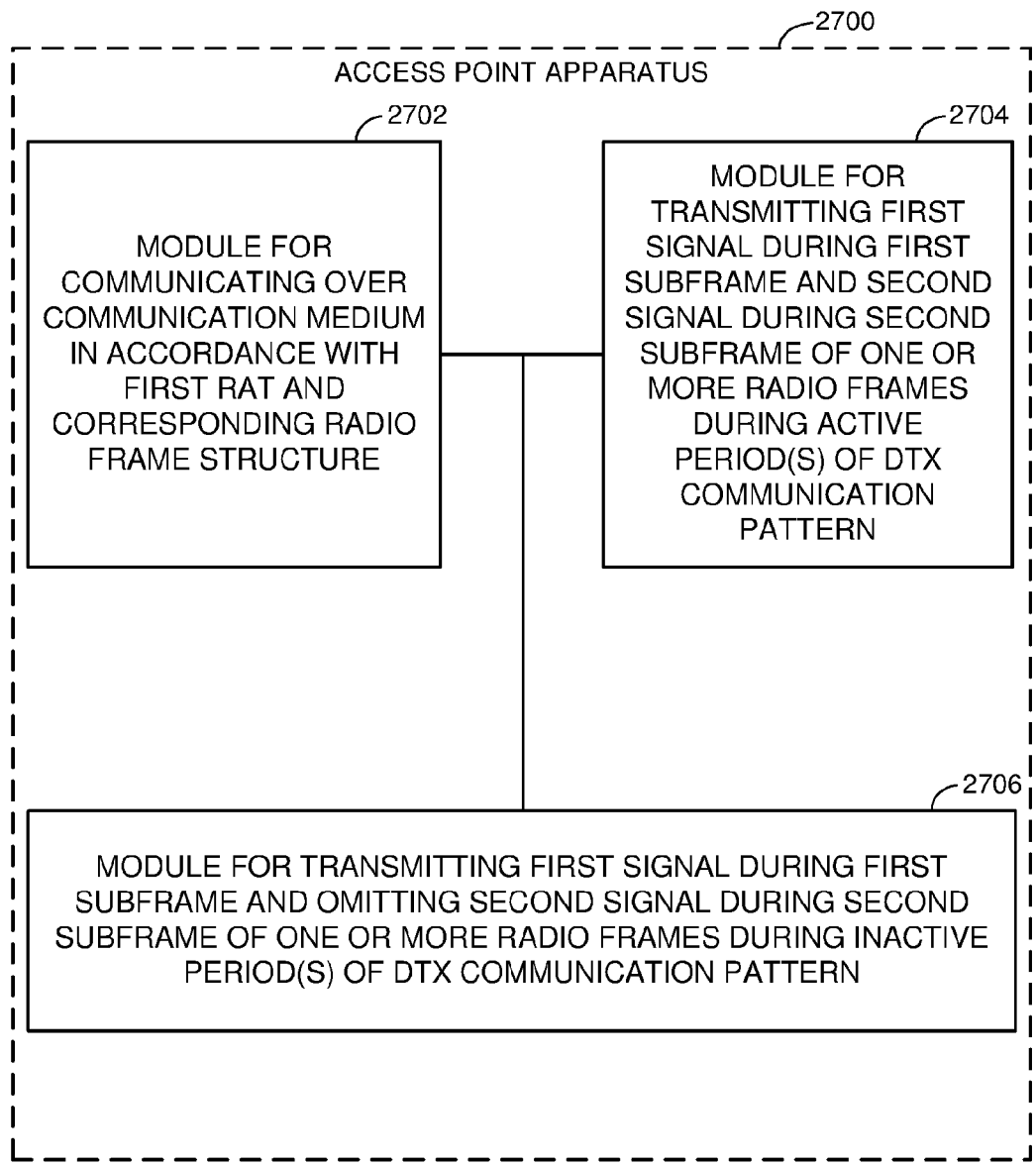
FIG. 27 illustrates an example access point apparatus represented as a series of interrelated functional modules.

FIG. 27 illustrates an example access point apparatus 2700 represented as a series of interrelated functional modules. A module for communicating 2702 may correspond at least in some aspects to, for example, a communication device or a component thereof as discussed herein (e.g., the communication device 112 or the like). A module for transmitting 2704 may correspond at least in some aspects to, for example, a communication controller or a component thereof as discussed herein (e.g., the communication controller 114 or the like). A module for transmitting 2706 may correspond at least in some aspects to, for example, a communication controller or a component thereof as discussed herein (e.g., the communication controller 114 or the like).

Figure 28:
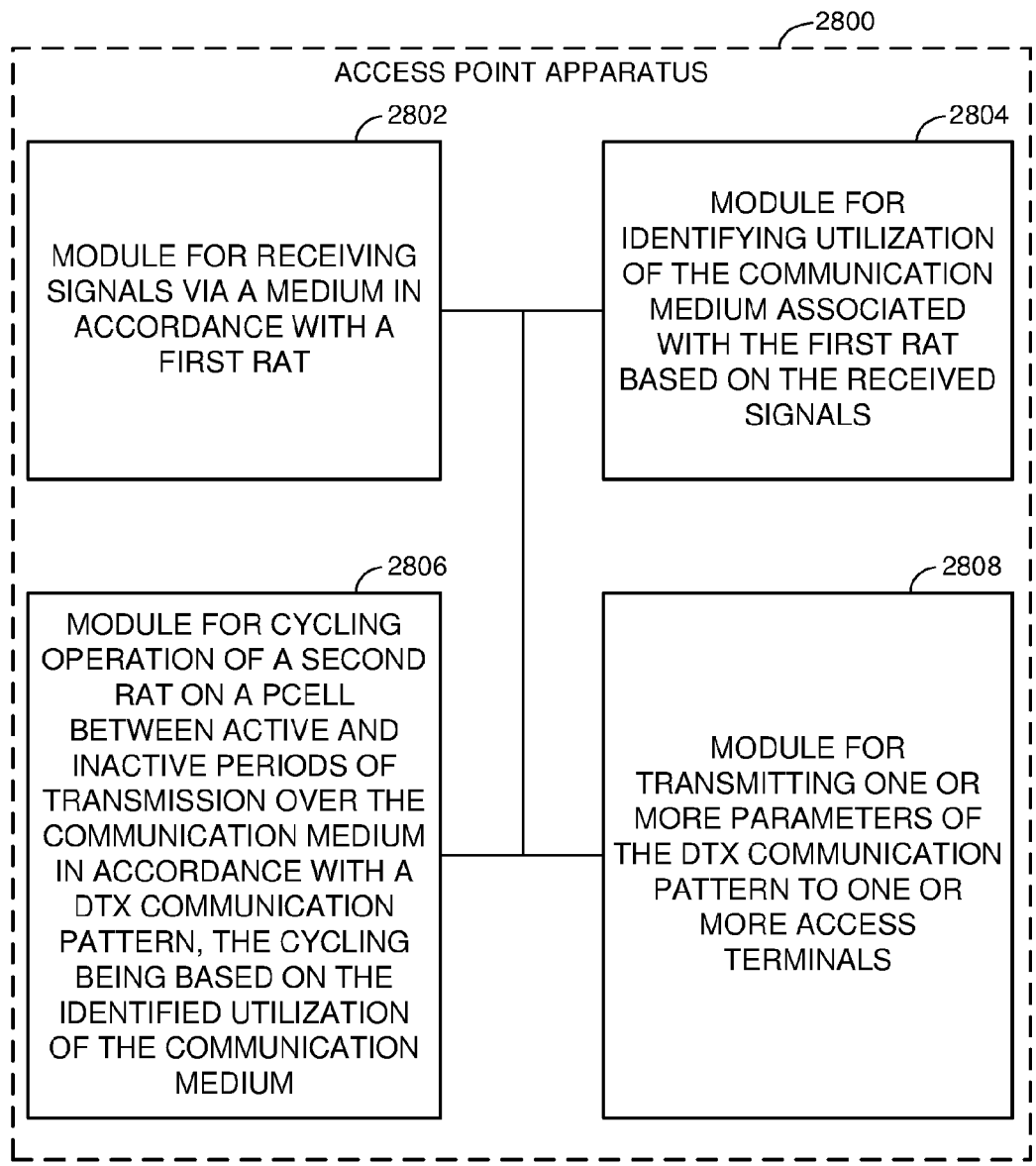
FIG. 28 illustrates an example access point apparatus represented as a series of interrelated functional modules.

FIG. 28 illustrates an example access point apparatus 2800 represented as a series of interrelated functional modules. A module for receiving 2802 may correspond at least in some aspects to, for example, a communication device or a component thereof as discussed herein (e.g., the communication device 112 or the like). A module for identifying 2804 may correspond at least in some aspects to, for example, a communication controller or a component thereof as discussed herein (e.g., the communication controller 114 or the like). A module for cycling 2806 may correspond at least in some aspects to, for example, a communication controller or a component thereof as discussed herein (e.g., the communication controller 114 or the like). A module for transmitting 2808 may correspond at least in some aspects to, for example, a communication device or a component thereof as discussed herein (e.g., the communication device 112 or the like).

Figure 29:
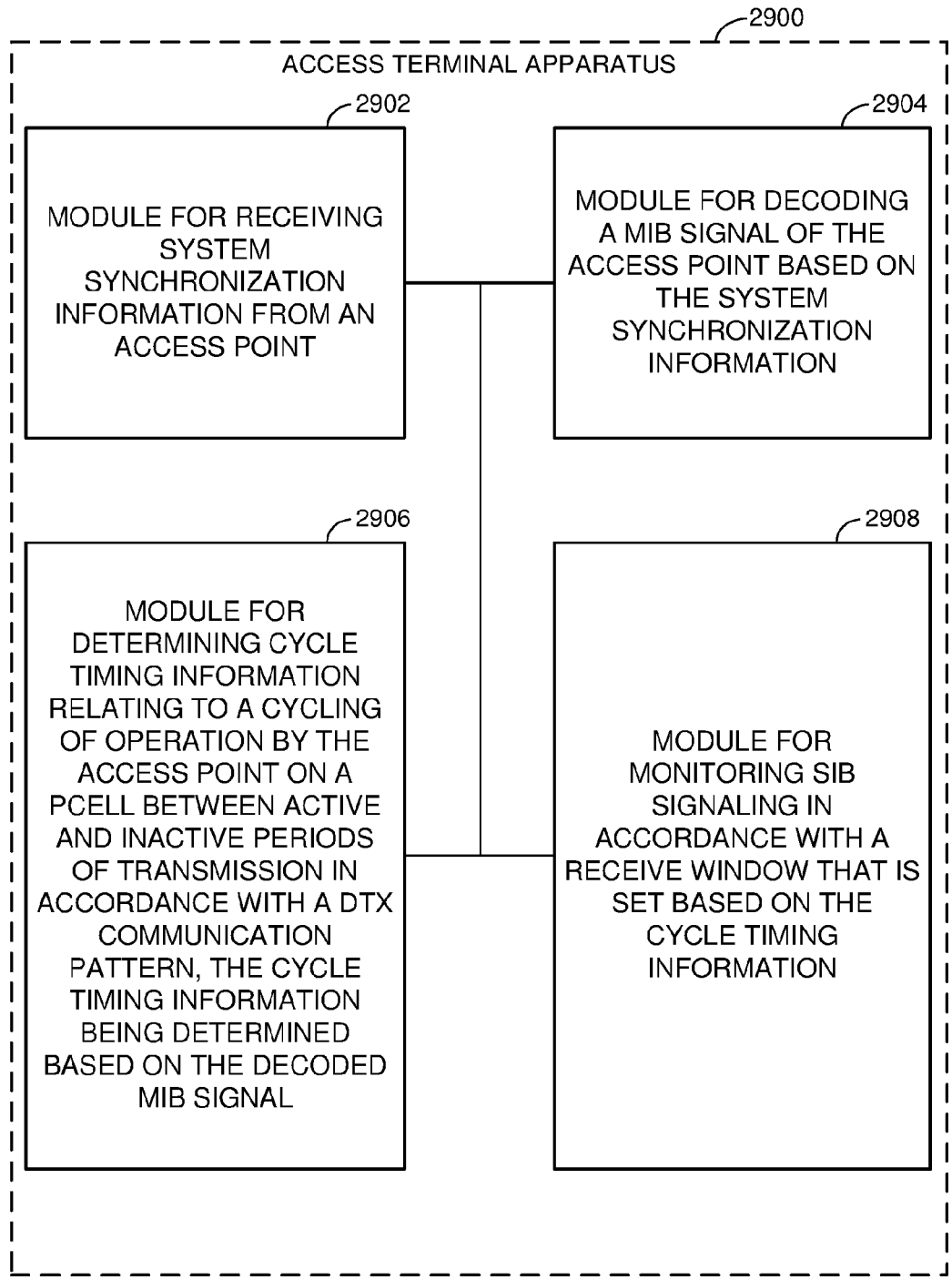
FIG. 29 illustrates an example access terminal apparatus represented as a series of interrelated functional modules.

FIG. 29 illustrates an example access terminal apparatus 2900 represented as a series of interrelated functional modules. A module for receiving 2902 may correspond at least in some aspects to, for example, a communication device or a component thereof as discussed herein (e.g., the communication device 122 or the like). A module for decoding 2904 may correspond at least in some aspects to, for example, a communication controller or a component thereof as discussed herein (e.g., the communication controller 124 or the like). A module for determining 2906 may correspond at least in some aspects to, for example, a communication controller or a component thereof as discussed herein (e.g., the communication controller 124 or the like). A module for monitoring 2908 may correspond at least in some aspects to, for example, a communication device or a component thereof as discussed herein (e.g., the communication device 122 or the like).

Figure 30:
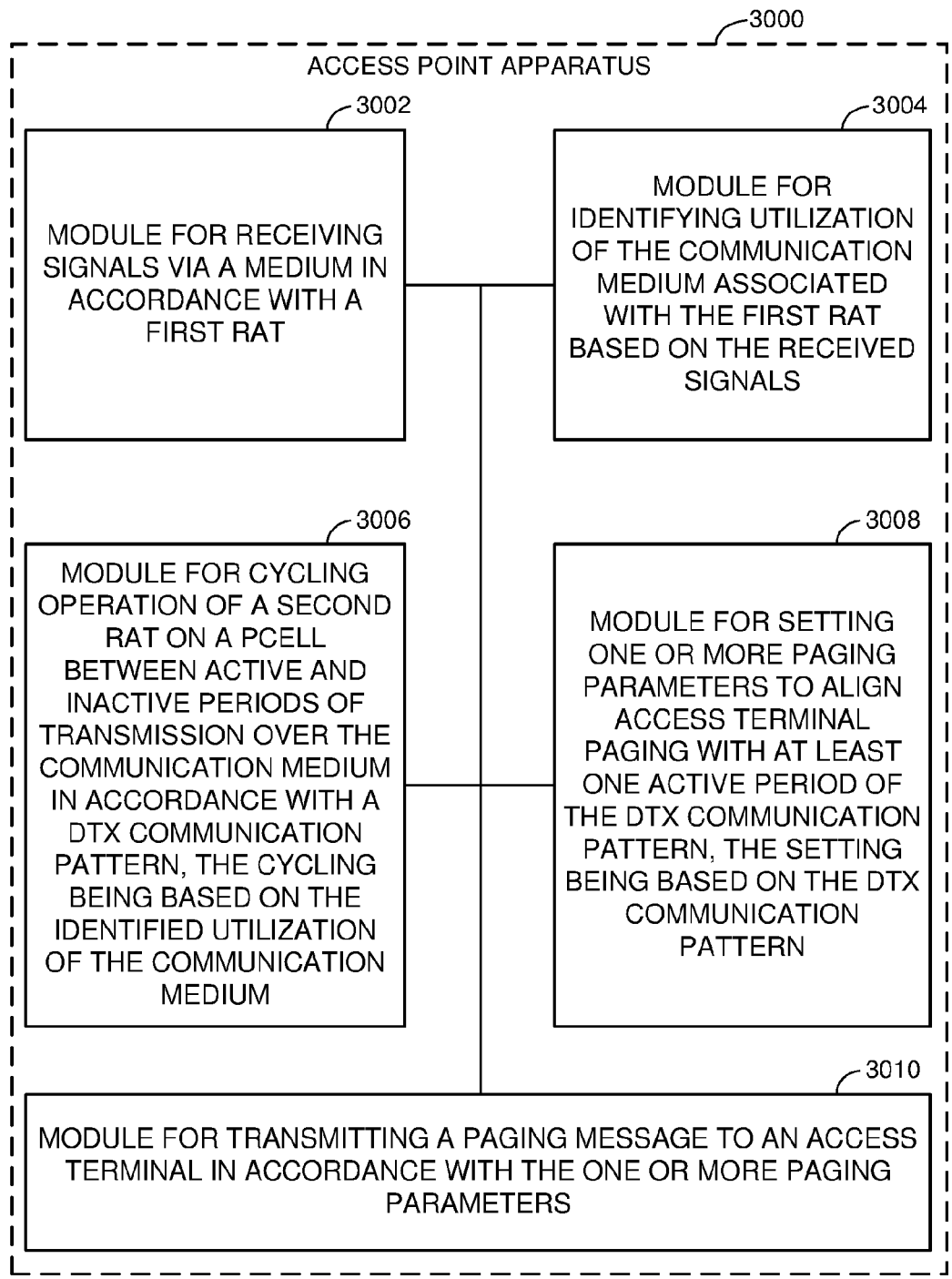
FIG. 30 illustrates an example access point apparatus represented as a series of interrelated functional modules.

FIG. 30 illustrates an example access point apparatus 3000 represented as a series of interrelated functional modules. A module for receiving 3002 may correspond at least in some aspects to, for example, a communication device or a component thereof as discussed herein (e.g., the communication device 112 or the like). A module for identifying 3004 may correspond at least in some aspects to, for example, a communication controller or a component thereof as discussed herein (e.g., the communication controller 114 or the like). A module for cycling 3006 may correspond at least in some aspects to, for example, a communication controller or a component thereof as discussed herein (e.g., the communication controller 114 or the like). A module for setting 3008 may correspond at least in some aspects to, for example, a communication controller or a component thereof as discussed herein (e.g., the communication controller 114 or the like). A module for transmitting 3010 may correspond at least in some aspects to, for example, a communication device or a component thereof as discussed herein (e.g., the communication device 112 or the like).

Figure 31:
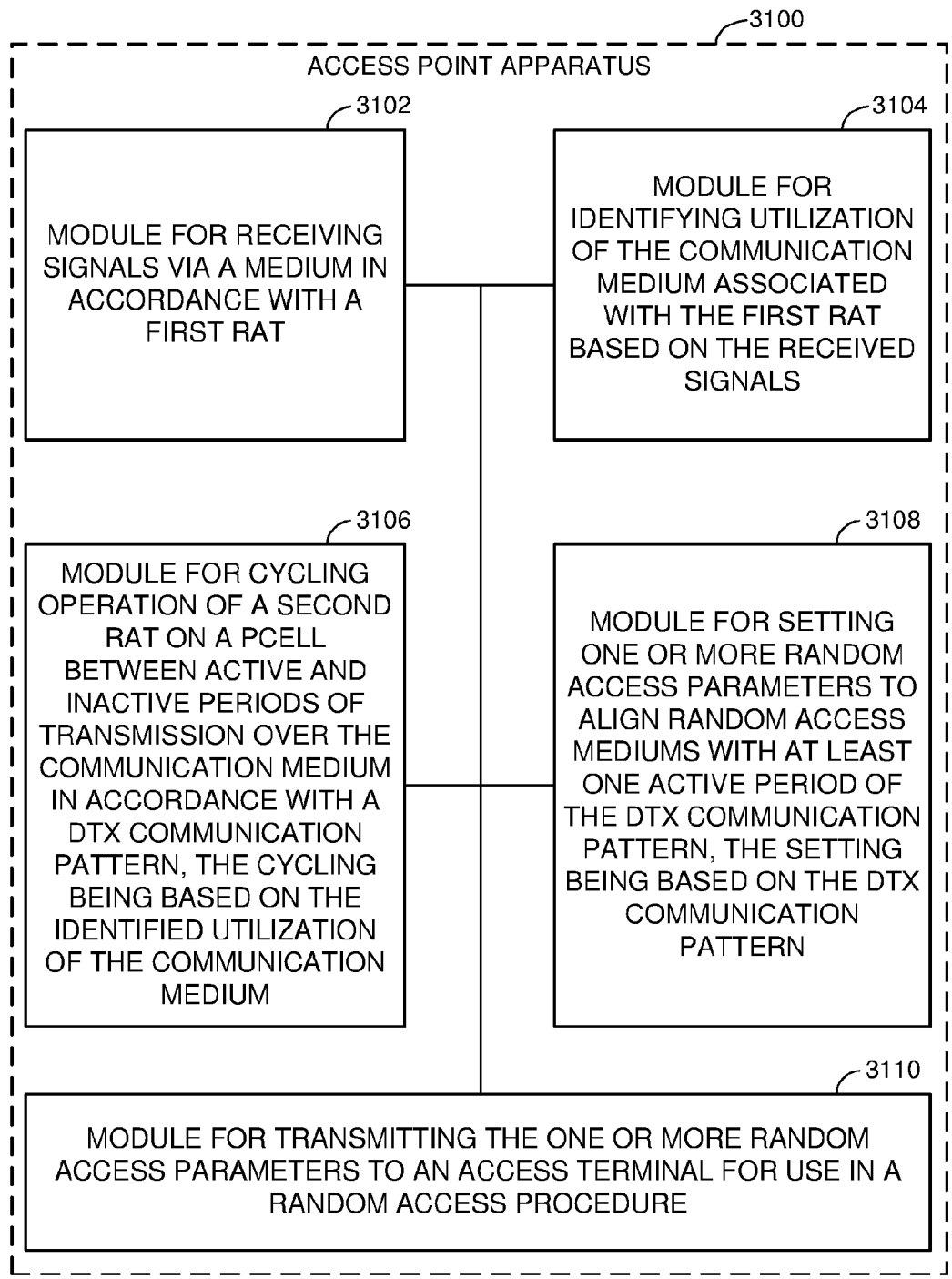
FIG. 31 illustrates an example access point apparatus represented as a series of interrelated functional modules.

FIG. 31 illustrates an example access point apparatus 3100 represented as a series of interrelated functional modules. A module for receiving 3102 may correspond at least in some aspects to, for example, a communication device or a component thereof as discussed herein (e.g., the communication device 112 or the like). A module for transmitting 3104 may correspond at least in some aspects to, for example, a communication device or a component thereof as discussed herein (e.g., the communication device 112 or the like). A module for cycling 3106 may correspond at least in some aspects to, for example, a communication controller or a component thereof as discussed herein (e.g., the communication controller 114 or the like). A module for setting 3108 may correspond at least in some aspects to, for example, a communication controller or a component thereof as discussed herein (e.g., the communication controller 114 or the like). A module for transmitting 3110 may correspond at least in some aspects to, for example, a communication device or a component thereof as discussed herein (e.g., the communication device 112 or the like).

Figure 32:
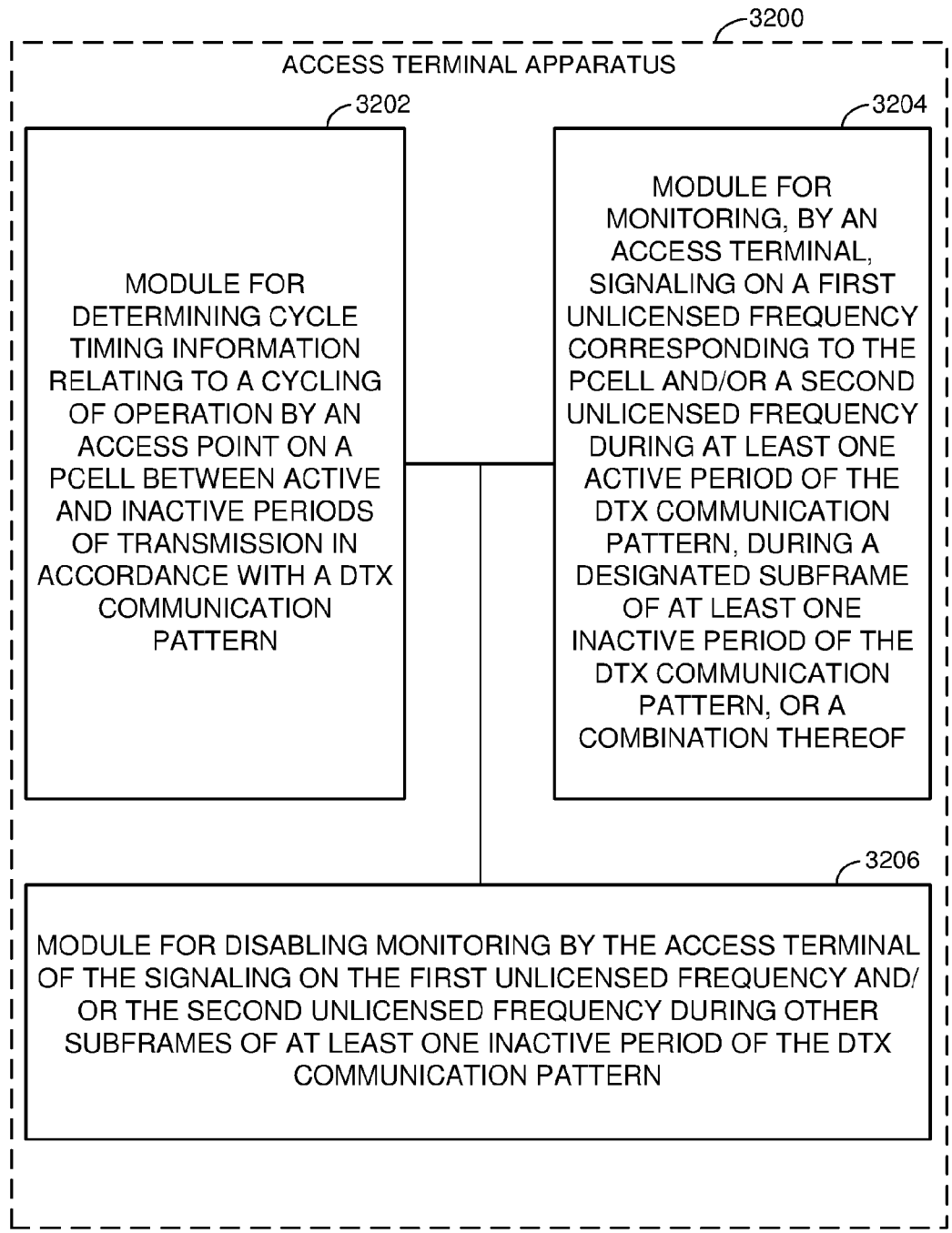
FIG. 32 illustrates an example access terminal apparatus represented as a series of interrelated functional modules.

FIG. 32 illustrates an example access terminal apparatus 3200 represented as a series of interrelated functional modules. A module for determining 3202 may correspond at least in some aspects to, for example, a communication controller or a component thereof as discussed herein (e.g., the communication controller 124 or the like). A module for monitoring 3204 may correspond at least in some aspects to, for example, a communication device or a component thereof as discussed herein (e.g., the communication device 122 or the like). A module for disabling 3206 may correspond at least in some aspects to, for example, a communication controller or a component thereof as discussed herein (e.g., the communication controller 124 or the like).

Figure 33:
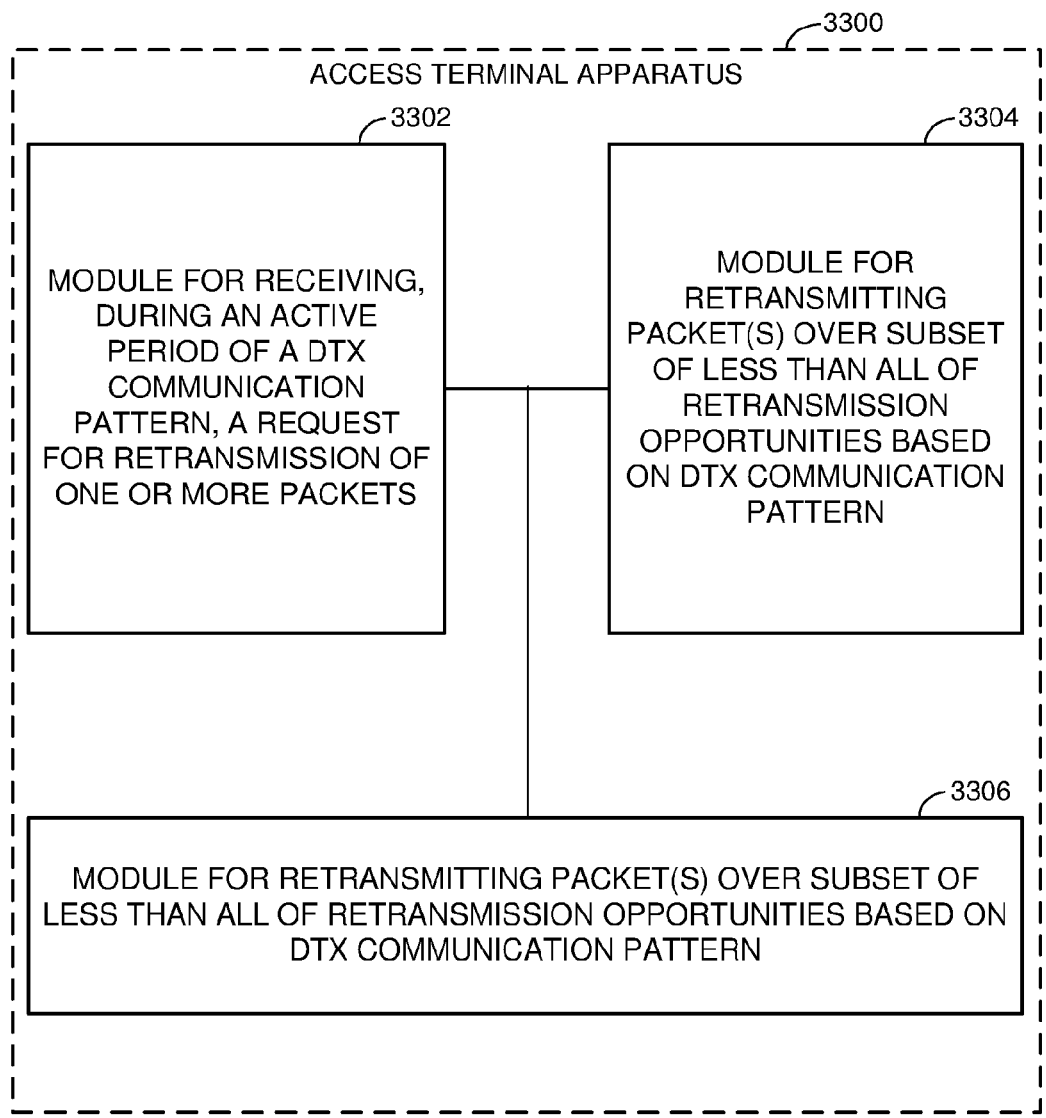
FIG. 33 illustrates an example access terminal apparatus represented as a series of interrelated functional modules.

FIG. 33 illustrates an example access terminal apparatus 3300 represented as a series of interrelated functional modules. A module for receiving 3302 may correspond at least in some aspects to, for example, a communication device or a component thereof as discussed herein (e.g., the communication device 122 or the like). A module for retransmitting 3304 may correspond at least in some aspects to, for example, a communication controller or a component thereof as discussed herein (e.g., the communication controller 124 or the like). A module for retransmitting 3306 may correspond at least in some aspects to, for example, a communication controller or a component thereof as discussed herein (e.g., the communication controller 124 or the like).

Figure 34:
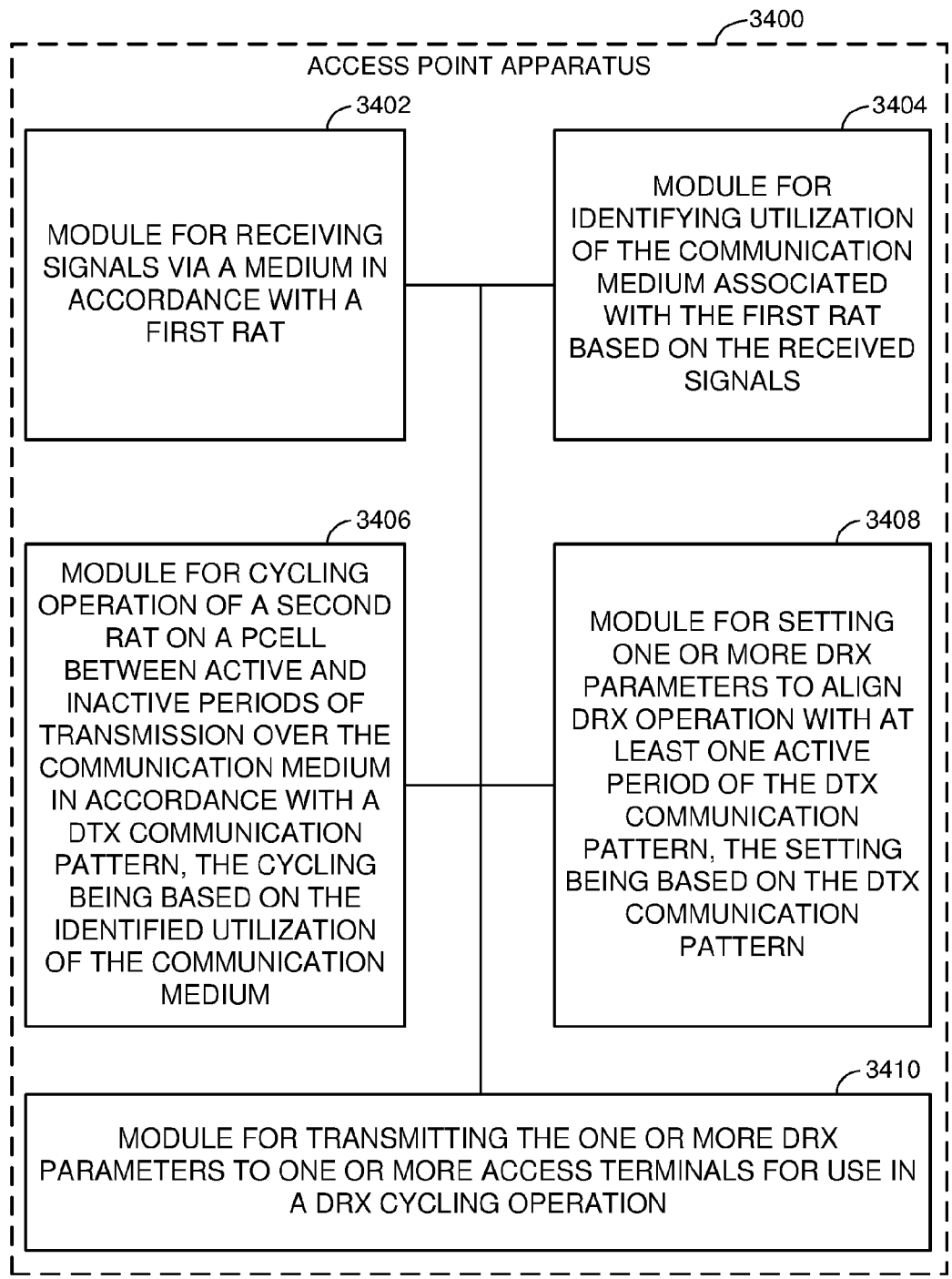
FIG. 34 illustrates an example access point apparatus represented as a series of interrelated functional modules.

FIG. 34 illustrates an example access point apparatus 3400 represented as a series of interrelated functional modules. A module for receiving 3402 may correspond at least in some aspects to, for example, a communication device or a component thereof as discussed herein (e.g., the communication device 112 or the like). A module for identifying 3404 may correspond at least in some aspects to, for example, a communication controller or a component thereof as discussed herein (e.g., the communication controller 114 or the like). A module for cycling 3406 may correspond at least in some aspects to, for example, a communication controller or a component thereof as discussed herein (e.g., the communication controller 114 or the like). A module for setting 3408 may correspond at least in some aspects to, for example, a communication controller or a component thereof as discussed herein (e.g., the communication controller 114 or the like). A module for transmitting 3410 may correspond at least in some aspects to, for example, a communication device or a component thereof as discussed herein (e.g., the communication device 112 or the like).

Figure 35:
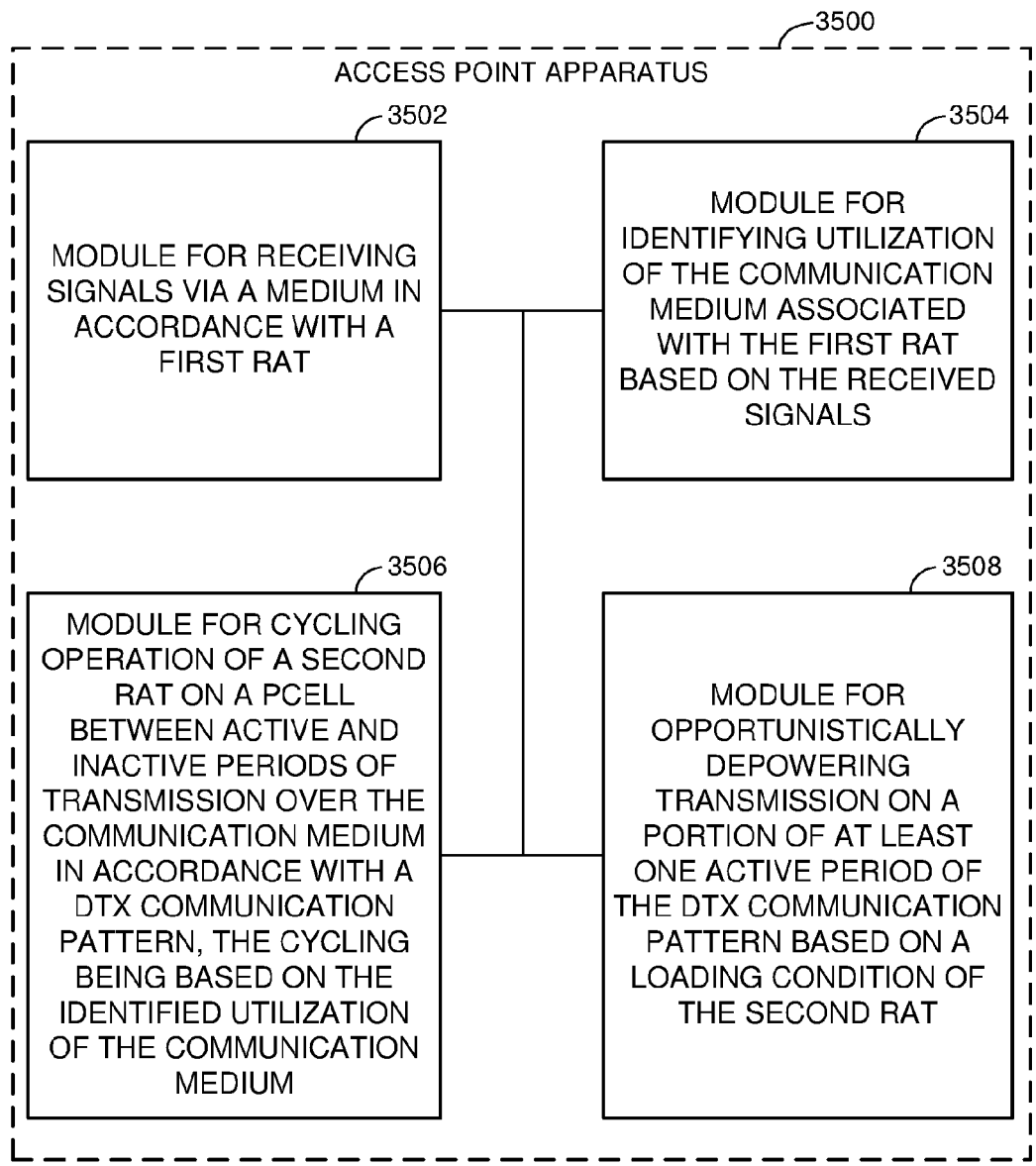
FIG. 35 illustrates an example access point apparatus represented as a series of interrelated functional modules.

FIG. 35 illustrates an example access point apparatus 3500 represented as a series of interrelated functional modules. A module for receiving 3502 may correspond at least in some aspects to, for example, a communication device or a component thereof as discussed herein (e.g., the communication device 112 or the like). A module for identifying 3504 may correspond at least in some aspects to, for example, a communication controller or a component thereof as discussed herein (e.g., the communication controller 114 or the like). A module for cycling 3506 may correspond at least in some aspects to, for example, a communication controller or a component thereof as discussed herein (e.g., the communication controller 114 or the like). A module for opportunistically depowering 3508 may correspond at least in some aspects to, for example, a communication controller or a component thereof as discussed herein (e.g., the communication controller 114 or the like).

Figure 36:
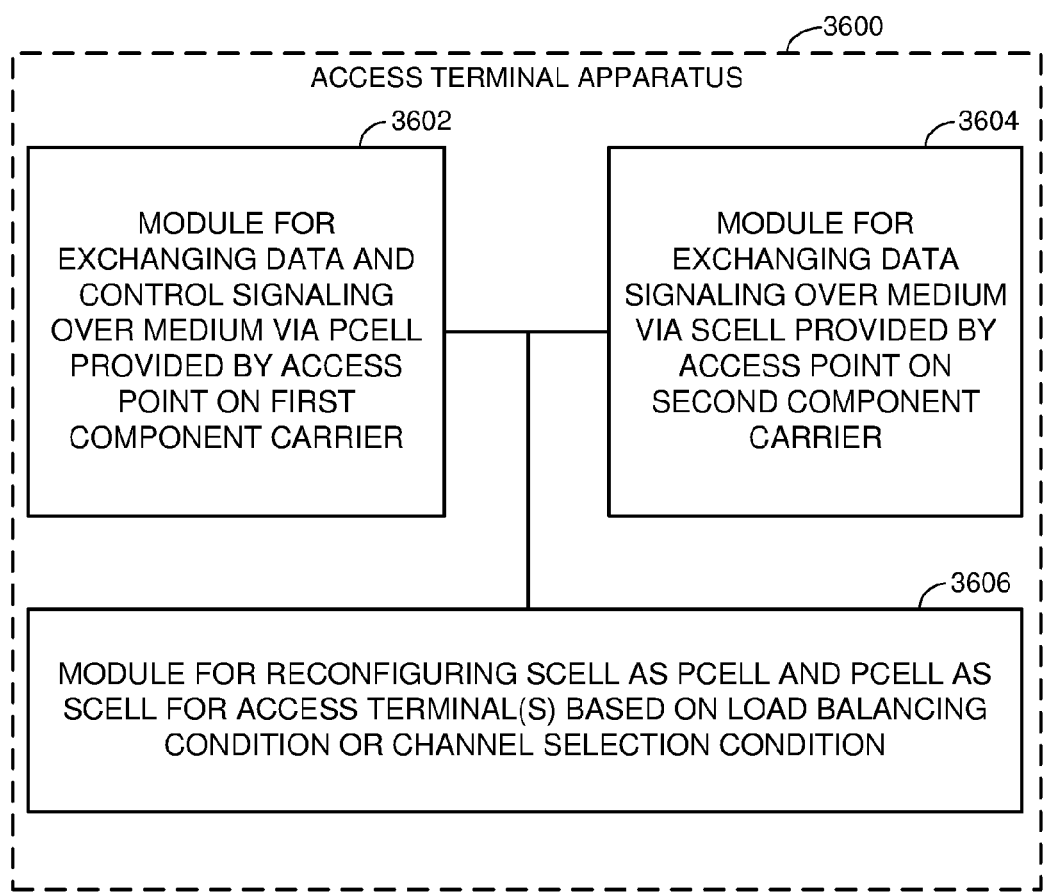
FIG. 36 illustrates an example access terminal apparatus represented as a series of interrelated functional modules.

FIG. 36 illustrates an example access terminal apparatus 3600 represented as a series of interrelated functional modules. A module for exchanging 3602 may correspond at least in some aspects to, for example, a communication device or a component thereof as discussed herein (e.g., the communication device 122 or the like). A module for exchanging 3604 may correspond at least in some aspects to, for example, a communication device or a component thereof as discussed herein (e.g., the communication device 122 or the like). A module for reconfiguring 3606 may correspond at least in some aspects to, for example, a communication controller or a component thereof as discussed herein (e.g., the communication controller 124 or the like).

The functionality of the modules of FIGS. 27-36 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 27-36, as well as other components and functions described herein, may be implemented using any suitable means. Such means also may be implemented, at least in part, using corresponding structure as taught herein. For example, the components described above in conjunction with the "module for" components of FIGS. 27-36 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of communication, comprising:
   exchanging, by an access point, data and control signaling over a communication medium via a Primary Cell (PCell) provided by the access point on a first component carrier;
   exchanging, by the access point, data signaling over the communication medium via a Secondary Cell (SCell) provided by the access point on a second component carrier;
   determining, by the access point, a load balancing condition based on a traffic imbalance between the first component carrier and one or more other component carriers that satisfies a threshold;
   reconfiguring, by the access point, the SCell as the PCell and the PCell as the SCell for one or more access terminals based on the load balancing condition, wherein the reconfiguring comprises:
      sending, via the first component carrier, a handover command to the one or more access terminals, the handover command instructing the one or more access terminals to reconfigure their PCell and SCell designations;
      receiving, via the second component carrier, a handover confirmation from the one or more access terminals; and
      switching PCell operation to the second component carrier;
   adjusting one or more cell reselection parameters to bias cell reselection towards selection of a target PCell; and
   signaling the one or more adjusted cell reselection parameters to an idle mode access terminal to trigger a cell reselection of the target PCell.

2. The method of claim 1, the reconfiguring comprising switching the reconfigured PCell to a third component carrier.

3. The method of claim 2, the reconfiguring comprising:
   sending via the second component carrier a handover command;
   receiving via the third component carrier a handover confirmation; and
   switching PCell operation to the third component carrier.

4. The method of claim 3, the reconfiguring further comprising:
   vacating the first component carrier in response to receiving the handover confirmation; and
   occupying the third component carrier in response to the vacating of the first component carrier.

5. The method of claim 1, further comprising:
   determining a channel selection condition based on a signal quality imbalance between the first component carrier and one or more other component carriers that satisfies a threshold,
   wherein the reconfiguring is further based on the channel selection condition.

6. An access point, comprising:
   a memory;
   at least one transceiver;
   at least one processor communicatively coupled to the memory and the at least one transceiver, the at least one processor configured to:
   direct the at least one transceiver to exchange data and control signaling over a communication medium via a Primary Cell (PCell) provided by the access point on a first component carrier;
   direct the at least one transceiver to exchange data signaling over the communication medium via a Secondary Cell (SCell) provided by the access point on a second component carrier;
   determine a load balancing condition based on a traffic imbalance between the first component carrier and one or more other component carriers that satisfies a threshold;
   direct the at least one transceiver to reconfigure the SCell as the PCell and the PCell as the SCell for one or more access terminals based on the load balancing condition, wherein the at least one processor being configured to direct the at least one transceiver to reconfigure comprises the at least one processor being configured to direct the at least one transceiver to:
      send via the first component carrier a handover command, the handover command instructing the one or more access terminals to reconfigure their PCell and SCell designations;
      receive via the second component carrier a handover confirmation; and
      switch PCell operation to the second component carrier;
   adjust one or more cell reselection parameters to bias cell reselection towards selection of a target PCell; and
   direct the at least one transceiver to signal the one or more adjusted cell reselection parameters to an idle mode access terminal to trigger a cell reselection of the target PCell.

7. The access point of claim 6, the at least one processor being configured to direct the at least one transceiver to reconfigure comprises the at least one processor being configured to direct the at least one transceiver to switch the reconfigured PCell to a third component carrier.

8. The access point of claim 7, the at least one processor being configured to direct the at least one transceiver to reconfigure comprises the at least one processor being configured to direct the at least one transceiver to:
   send via the second component carrier a handover command;
   receive via the third component carrier a handover confirmation; and
   switch PCell operation to the third component carrier.

9. The access point of claim 8, the at least one processor being further configured to direct the at least one transceiver to reconfigure comprises the at least one processor being configured to direct the at least one transceiver to:
   vacate the first component carrier in response to reception of the handover confirmation; and
   occupy the third component carrier in response to the vacation of the first component carrier.

10. The access point of claim 6, the at least one processor being further configured to:
    determine a channel selection condition based on a signal quality imbalance between the first component carrier and one or more other component carriers that satisfies a threshold,
    wherein the reconfiguration is further based on the 14 channel selection condition.

11. An access point, comprising:
    means for storing;
    means for communicating; and
    means for processing communicatively coupled to the means for storing and the means for communicating, the means for processing configured to:
    cause the means for communicating to exchange data and control signaling over a communication medium via a Primary Cell (PCell) provided by the access point on a first component carrier;

cause the means for communicating to exchange data signaling over the communication medium via a Secondary Cell (SCell) provided by the access point on a second component carrier;

determine a load balancing condition based on a traffic imbalance between the first component carrier and one or more other component carriers that satisfies a threshold;

cause the means for communicating to reconfigure the SCell as the PCell and the PCell as the SCell for one or more access terminals based on the load balancing condition, wherein the means for processing being configured to cause the means for communicating to reconfigure comprises the means for processing being configured to cause the means for communicating to:

send via the first component carrier a handover command, the handover command instructing the one or more access terminals to reconfigure their PCell and SCell designations;

receive via the second component carrier a handover confirmation; and switch PCell operation to the second component carrier;

adjust one or more cell reselection parameters to bias cell reselection towards selection of a target PCell; and cause the means for communicating to signal the one or more adjusted cell reselection parameters to an idle mode access terminal to trigger a cell reselection of the target PCell.

12. The access point of claim 11, wherein the means for processing being configured to cause the means for communicating to reconfigure comprises the means for processing being configured to cause the means for communicating to switch the reconfigured PCell to a third component carrier.

13. The access point of claim 12, wherein the means for processing being configured to cause the means for communicating to reconfigure comprises the means for processing being configured to cause the means for communicating to:

send via the second component carrier a handover command;

receive via the third component carrier a handover confirmation; and switch PCell operation to the third component carrier.

14. The access point of claim 13, wherein the means for processing being configured to cause the means for communicating to reconfigure comprises the means for processing being further configured to cause the means for communicating to:

vacate the first component carrier in response to reception of the handover confirmation; and occupy the third component carrier in response to the vacation of the first component carrier.

15. The access point of claim 11, further comprising:

means for determining a channel selection condition based on a signal quality imbalance between the first component carrier and one or more other component carriers that satisfies a threshold, wherein the reconfiguration is further based on the channel selection condition.

16. A non-transitory computer-readable medium comprising code, which, when executed by a processor of an access point, causes the processor to perform operations for communication, the non-transitory computer-readable medium comprising:

code for exchanging data and control signaling over a communication medium via a Primary Cell (PCell) provided by the access point on a first component carrier;

code for exchanging data signaling over the communication medium via a Secondary Cell (SCell) provided by the access point on a second component carrier;

code for determining, by the access point, a load balancing condition based on a traffic imbalance between the first component carrier and one or more other component carriers that satisfies a threshold;

code for reconfiguring the SCell as the PCell and the PCell as the SCell for one or more access terminals based on the load balancing condition, the code for reconfiguring comprising:

code for sending via the first component carrier a handover command, the handover command instructing the one or more access terminals to reconfigure their PCell and SCell designations;

code for receiving via the second component carrier a handover confirmation; and code for switching PCell operation to the second component carrier;

code for adjusting one or more cell reselection parameters to bias cell reselection towards selection of a target PCell; and code for signaling the one or more adjusted cell reselection parameters to an idle mode access terminal to trigger a cell reselection of the target PCell.

17. The non-transitory computer-readable medium of claim 16, the code for reconfiguring comprising code for switching the reconfigured PCell to a third component carrier.

18. The non-transitory computer-readable medium of claim 17, the code for reconfiguring comprising:

code for sending via the second component carrier a handover command;

code for receiving via the third component carrier a handover confirmation; and code for switching PCell operation to the third component carrier.

19. The non-transitory computer-readable medium of claim 18, the code for reconfiguring further comprising:

code for vacating the first component carrier in response to reception of the handover confirmation; and code for occupying the third component carrier in response to the vacation of the first component carrier.

20. The non-transitory computer-readable medium of claim 16, further comprising:

code for determining a channel selection condition based on a signal quality imbalance between the first component carrier and one or more other component carriers that satisfies a threshold, wherein the reconfiguration is further based on the channel selection condition.

* * * * *